US011654872B2

(12) United States Patent
Nilsson et al.

(10) Patent No.: US 11,654,872 B2
(45) Date of Patent: May 23, 2023

(54) ELECTRIC BRAKE SYSTEM FOR A VEHICLE

(71) Applicant: Haldex Brake Products Aktiebolag, Landskrona (SE)

(72) Inventors: Anders Nilsson, Landskrona (SE); Anders Lindqvist, Landskrona (SE); Peter Nilsson, Oerkelljunga (SE)

(73) Assignee: HALDEX BRAKE PRODUCTS AKTIEBOLAG, Landskrona (SE)

( * ) Notice: Subject to any disclaimer, the term of this patent is extended or adjusted under 35 U.S.C. 154(b) by 888 days.

(21) Appl. No.: 16/447,281

(22) Filed: Jun. 20, 2019

(65) Prior Publication Data
US 2019/0299944 A1 Oct. 3, 2019

Related U.S. Application Data

(63) Continuation of application No. PCT/EP2017/081039, filed on Nov. 30, 2017.

(30) Foreign Application Priority Data

Dec. 22, 2016 (EP) ..................................... 16206505

(51) Int. Cl.
*B60T 7/04* (2006.01)
*B60W 20/14* (2016.01)
(Continued)

(52) U.S. Cl.
CPC .............. *B60T 7/042* (2013.01); *B60T 8/885* (2013.01); *B60T 13/66* (2013.01); *B60T 13/74* (2013.01);
(Continued)

(58) Field of Classification Search
CPC .... B60T 7/042; B60T 13/66; B60T 2270/608; B60T 8/885; B60T 13/74; B60T 13/741;
(Continued)

(56) References Cited

U.S. PATENT DOCUMENTS 6,291,951 B1 * 9/2001 Baulier ..................... H02P 3/04
318/368
7,380,891 B2 * 6/2008 Ohashi .................... B60T 13/74
303/122.08
(Continued)

FOREIGN PATENT DOCUMENTS

DE 197 55 050 A1 7/1999
DE 198 41 170 C1 2/2000
(Continued)

OTHER PUBLICATIONS

Translation of French Patent No. FR 3030419 to Hurwic obtained from website: https://worldwide.espacenet.com on May 24, 2022.*
(Continued)

*Primary Examiner* — Pamela Rodriguez
(74) *Attorney, Agent, or Firm* — Thomas | Horstemeyer, LLP

(57) ABSTRACT

The invention relates to an electric brake system (1) for a vehicle. The electric brake system (1) comprises electric brake devices (2). The electric brake devices (2) are powered and controlled by redundant capacitor-based power sources (9A, 9B) and redundant control circuits (16A, 16B). The capacitor-based power source (9A, 9B) can be integrated into axle modules (39A, 39B) located close to a vehicle axle (61A, 61B). The capacitor-based power sources (9A, 9B) are recharged by a hub generator, a regeneration power source (32).

22 Claims, 16 Drawing Sheets

(51) Int. Cl.
  B60W 10/192 (2012.01)
  B60W 30/18 (2012.01)
  B60T 13/74 (2006.01)
  B60T 13/66 (2006.01)
  B60T 8/88 (2006.01)
  H02J 7/14 (2006.01)

(52) U.S. Cl.
  CPC ......... B60T 13/741 (2013.01); B60W 10/192 (2013.01); B60W 20/14 (2016.01); B60W 30/18127 (2013.01); H02J 7/14 (2013.01); B60T 2270/413 (2013.01); B60T 2270/414 (2013.01); B60T 2270/608 (2013.01)

(58) Field of Classification Search
  CPC ........ B60T 2270/413; B60T 2270/414; B60W 10/192; B60W 20/14; B60W 30/18127; H02J 7/14
  See application file for complete search history.

(56) References Cited

U.S. PATENT DOCUMENTS

| | | | |
|---|---|---|---|
| 7,815,021 | B2 | 10/2010 | Baumgartner et al. |
| 8,427,003 | B2* | 4/2013 | Morita ................. H01M 10/44 307/9.1 |
| 9,097,747 | B2* | 8/2015 | Ikeda ................. G01R 27/2605 |
| 2004/0195016 | A1 | 10/2004 | Shimizu et al. |
| 2004/0212250 | A1 | 10/2004 | Yokoyama et al. |
| 2005/0269870 | A1 | 12/2005 | Ohashi et al. |
| 2006/0108867 | A1 | 5/2006 | Ralea |
| 2008/0135357 | A1 | 6/2008 | Lang |
| 2013/0008749 | A1 | 1/2013 | Sandberg et al. |
| 2016/0072723 | A1 | 3/2016 | Shanmuganathan et al. |

FOREIGN PATENT DOCUMENTS

| | | |
|---|---|---|
| EP | 1 302 371 A2 | 4/2003 |
| EP | 1 741 607 A2 | 1/2007 |
| EP | 1 302 371 B1 | 5/2008 |
| EP | 1 977 134 B1 | 12/2009 |
| FR | 3 030 419 A1 | 6/2016 |
| JP | 200625595 | 12/1899 |
| JP | 2000312444 | 12/1899 |
| JP | 2005028908 | 12/1899 |
| WO | 2006/058825 A1 | 6/2006 |
| WO | 2016/102906 A1 | 6/2016 |

OTHER PUBLICATIONS

Japanese Office Action in related, co-pending JP Application No. 2019-533005, dated Jul. 6, 2021.

PCT International Search Report in co-pending, related PCT Application No. PCT/EP2017/081039, dated Feb. 19, 2018.

* cited by examiner

ELECTRIC BRAKE SYSTEM FOR A VEHICLE

CROSS REFERENCE TO RELATED APPLICATIONS

This application is a continuation of International Application PCT/EP2017/081039 with an international filing date of Nov. 30, 2017 and claiming priority to European Patent Application No. EP 16 206 505.6 entitled "Electric Brake System for a Vehicle", filed on Dec. 22, 2016.

FIELD OF THE INVENTION

The present invention relates to an electric brake system for a vehicle, in particular a commercial vehicle, a vehicle driven solely by electric energy and/or a hybrid vehicle driven both by electric energy as well as by a combustion engine to mention only some examples. The vehicle might be a bus, a commercial vehicle, a tractor, a train and/or a trailer. In a vehicle of this type, in the electric brake system a brake force is generated by at least one electric brake device. In the electric brake device a contact force between brake elements (in particular a brake pad and a brake disc) is controlled by an electric brake actuator.

BACKGROUND OF THE INVENTION

EP 1 302 371 A2, corresponding to EP 1 302 371 B1, describes a known power supply system according to DE 197 55 050.9. In the power supply system power is supplied to an electro-motoric brake device by two redundant power sources by a common supply line. The redundant power sources guarantee that it is possible to operate the brake device also in case of a failure of one of the power sources. However, in case of a failure of the supply line (in particular a short-circuit or a rupture of the line) it is no longer possible to operate the brake device. EP 1 302 371 A2 suggests to connect the redundant power sources via redundant supply lines to electric ports of the brake device such that two separate circuits are used for supplying the brake device with electric power. The two circuits are separated by diodes. For one embodiment, a first power source is formed by a generator (e.g. with a supply voltage of 42 V) whereas the second power source is an accumulator (e.g. with a lower supply voltage of 14 V). Due to the redundant power supply, it is possible to reduce the wire cross-sectional area of the supply lines to ⅔ or to the half. In the case of using different nominal supply voltages of the power sources it is possible to transform the supply voltage to the other supply voltage by a DC/DC voltage transformer which can also be a bi-directional DC/DC transformer. When using a bi-directional DC/DC transformer, one of the two circuits can be prioritized so that a larger percentage of the supply power is supplied by this circuit. Any failure of one of the circuits can be brought to the attention of the driver by suitable acoustic or optical signal means. Also redundant control lines for controlling the operation of the electro-motoric brake device can be used.

US 2016/0072723 A1 discloses an electric drive unit including a motor having a stator with a winding wound around the stator and a rotor and a power converting device comprising a circuit for supplying electric power to the motor. The power converting device includes two power converting sections separated by a separating protrusion or wall. The power converting sections include semiconductor devices as MOSFETs used for converting a DC power input from a power source to three-phase AC power used for driving the different phases of the motor.

US 2004/0212250 A1 describes the problem that also in a redundant electric brake system problems might arise when an abnormality develops in a relay unit used for switching between the power supply from a main accumulator and an auxiliary accumulator. US 2004/0212250 A1 suggests an electric brake system with a plurality of power sources and a power breaker capable of insulating and separating a plurality of brake actuators into two separate brake system parts. Therefore, even when an abnormality develops, the brake system part wherein the abnormality occurs can be separated and the other brake system part can still be operated under use of the associated power source. For one embodiment proposed in US 2004/0212250 A1, the brake system includes a cut-off switch for dividing a power source line into a first power source line and a second power source line. A first and second voltage detection circuit detects a voltage in the associated power source line. The second power source line supplies driving power to the first voltage detection circuit, and the first power source line supplies driving power to the second voltage detection circuit. Even when an abnormality develops in the power source line, the cut-off switch cuts off the power source line. Then, the driving power is supplied from the power source line on the normal side to the voltage detection circuit that detects the voltage of the power source line on the abnormal side. Consequently, voltage detection can be continued. The cut-off state can be released as soon as an abnormality is eliminated. Furthermore, it is possible that a power breaker also includes a switch that is fused by thermal energy. Even when the cut-off switch does not operate as expected, the switch that is fused by thermal energy will be able to cut off the power source line. US 2004/0212250 A1 also suggests to use different power breakers having different current values as a power cut-off condition.

FR 3 030 419 A1, corresponding to WO 2016/102906 A1, describes a prior art parking brake system comprising an electric parking brake actuator which is actuated by the user by pressing a push button located on the dashboard near the steering wheel or automatically triggered as soon as the vehicle is stopped. Conventionally, these parking brake systems are supplied by a battery with electric power. However, for example in winter times the battery is stressed by the consumption of energy by a heater or headlights such that the electric power supplied by the battery is no longer sufficient for operating the electric parking brake actuator. FR 3 030 419 A1 suggests to equip an electric parking brake system both with a main battery and an electrical energy storage member such that the electric parking brake system is not only dependent on the main battery. Instead, if the voltage supplied by the main battery is insufficient, the storage member is able to take over to provide a voltage so that the electric parking brake system is able to fulfil at least priority functions, in particular an emergency brake action via the parking brake. The additional electrical energy storage member might be a capacitor, a supercapacitor or, a lithium ion rechargeable battery. The additional electrical energy storage member is powered and reloaded by the main engine when the vehicle is driving. In the case of a use of a non-rechargeable battery, the charging capacity of the battery has to be chosen to correspond to the estimated lifetime of the vehicle or to the period of time separating two maintenance intervals. By a diode a discharge of the additional electrical energy storage member to a part of the vehicle separate from the electric parking brake system can be prevented. Control means allow a monitoring of a charging level, a comparison of the charging level to a threshold which in particular correlates with a predetermined number of parking brake applications. In the case that the charging level is below the threshold, a release of the parking brake might be prohibited until a predetermined condition (in particular the provision of a minimum voltage by the main battery of the vehicle) is met. The electric parking brake system might have two independent circuits associated with different wheels of the vehicle.

EP 1 741 607 A2 discloses an electromechanical brake system comprising a primary power supply formed by a battery. The battery is connected via a current limiting device to electromechanical brake units associated with the wheels of a vehicle. The brake units include mechanical brake components and an electric motor for actuating the mechanical brake components. Electrically connected in parallel to each brake unit is at least one capacitor which is charged by the primary power supply during normal operation. In the event of a failure of the primary power supply the capacitors provide electric power to the electromechanical brake units. The capacitors are embodied as double layer capacitors (i.e. DLC, supercaps or ultracaps). The capacitors achieve a much higher power density than batteries and the capacitors are able to discharge energy very quickly which might be advantageous in emergency situations. Diodes or MOSFETs can be used for avoiding a reverse flow of electric power from the capacitors to the primary power supply. Electronic control units monitor the status of the primary power supply and the input current of an alternator.

US 2006/0108867 A1 relates to a brake system for vehicles, in particular for use in an aircraft. The brakes of the aircraft are operated by an electromechanical brake actuator supplied with electric power by a main supply source and an electrical energy back-up system storing electrical energy and used in an absence of the main supply source. The brake system includes redundant digital brake system control units (BSCUs) which carry out the brake control and an antiskid function. Furthermore, the system includes four electromechanical actuator controllers (EMACs) which convert brake clamp force commands from the BSCUs to servo motor control signals which provide actuator braking forces. A brake signal from a pilot of the aircraft generated by a pair of left and right brake pedal transducers is transferred as a brake command signal to the BSCUs which communicate with the EMACs. The brake actuators might have associated torque sensors and wheel speed sensors. The outputs of these sensors are transmitted to the EMACs and used by the EMACs for the brake control and antiskid function. The BSCUs, EMACs and brake actuators are powered by one or more electrical power sources. In an electrical energy back-up system a first capacitor bank and a second capacitor bank as well as a battery are provided. A power bus supplies DC power to the capacitor banks via converters. The converters convert the voltage from the power bus to a voltage of 120 V (DC) and output the converted voltage across supply rails. The supply rails are responsible for providing energy to the EMACs associated to the left and right inner and outer brakes. The power supply allows the EMACs to control and operate the brake actuators to provide braking actions of the wheels. The electrical energy stored in the capacitor banks serves as a back-up energy source in the case of a power failure on the power buses (e.g. due to engine failure, faulty wiring and the like). The capacitor banks are dimensioned to store sufficient back-up electrical energy to allow the braking system to effect sufficient braking for at least one rejected take off or to provide sufficient energy needed for a complete stop including antiskid brake control and braking for ground maneuvering after the stop. Preferably, the capacitor banks have a capacity of 18 Wh. The BSCUs can also be powered at least in part by the voltage across the supply rails. Furthermore, the power buses are connected to a rechargeable battery via a charger. The output of the rechargeable battery is coupled to each of the supply rails via reverse polarity protection diodes. When parking the vehicle for extended periods of time there may be no power provided on the power buses and the energy stored in the capacitor banks may not be sufficient. In this case the rechargeable battery might serve for delivering sufficient power to the EMACs to engage and maintain parking brake operation.

DE 198 41 170 C1 discloses a brake system comprising an electrically actuated brake actuator which is supplied with electric power in a redundant way by a power circuit and an auxiliary power storing device. Here, the capacity of the auxiliary power storing device is dimensioned such that (as prescribed by law) at least nine service brake actions with a full actuation of the brake system are possible without using the power circuit. For reducing the consumption of energy, DE 198 41 170 C1 proposes that the brake actuator is designed such that the current required for upholding a stationery brake force is smaller than the current required for changing the brake force.

WO 2006/058825 A1, corresponding to US 2008/0135357 A1, discloses a motor vehicle comprising a 12 V/14 V power circuit and electromechanical brakes of the wheels of the front and rear axle. The electromechanical brakes are actuated by a brake actuator unit. The brake actuator unit comprises an electric motor and preferably an additional transmission. The brake actuator units are controlled by a control unit. The control unit processes signals from a brake signal transducer and other transducers and control systems. The control unit controls the brake actuator units such that the required brake force is generated. The electric power is supplied via two accumulators which are recharged by an electric generator. In order to avoid a failure of the brake system in the case of a failure of an accumulator two independent circuits are provided. In a first circuit, a first accumulator supplies energy to the brake actuator units of the wheels of the front axle whereas the other accumulator supplies energy to the brake actuator units of the wheels at the rear axle. Furthermore, in the case of a failure of one accumulator the respective other accumulator is additionally switched to the electromechanical brakes associated with the first accumulator being subject to the failure. The brake actuator unit is arranged within the rim of the vehicle wheel. Supercap-capacitors are arranged in parallel connection to the accumulators and serve for buffering peaks of the power demanded by the brake actuator units. These peaks increase the power losses, require increased wire cross-sections and cause problems when using a 12 V/14 V power circuit. The capacitor is located as close as possible to the electric motor, so within the brake actuator unit 10, in order to keep the energy losses as small as possible when unloading the capacitor and in order to keep the wiring between the capacitor and the electric motor as short as possible. However, care has to be taken that the temperature of the capacitor does not exceed a threshold in a specific temperature region between 70° C. and 125° C. Accordingly, the capacitor should not be directly attached to the electric motor. The capacitors are goldcap-capacitors, supercap-capacitors or ultracap-capacitors which have a high capacity at a low weight and which are small. It is also possible to use a plurality of parallel supporting capacitors.

DE 197 55 050 A1 discloses power circuits of a vehicle used for powering electro-mechanical brakes. Two power circuits comprise significantly differing voltages (e.g. voltages of 12 V and 36 V or voltages of 14 V and 42 V). The electric power is generated by a starter-generator. The output voltage of the starter-generator is controlled by a power control device to a voltage U1=42 V. By a DC converter the output voltage U1 is transformed to a lower voltage U2=14 V. Two batteries (comprising an integrated battery state recognition) are arranged between the 42 V of the power control device 11 (, respectively the 14 V outlet of the voltage converter) and ground. The voltages U1=42 V and U2=14 V are loading voltages, whereas the associated nominal voltages are 36 V and 12 V. A first electromechanical brake is supplied by a first battery with the voltage U2=14 V. A capacitor is arranged parallel to the electromechanical brake. Instead, a second electromechanical brake is supplied by the other battery with a voltage of 42 V. Further consumers as a display lamp and a window heating can be supplied with one of the given voltages U1, U2. The capacitor serves as a buffer capacitor used for handling voltage peaks when actuating the electromechanical brake and for avoiding that the 14 V, (respectively 12 V power circuit voltage) falls below 11 V. The power circuit comprising the higher voltage does not require a buffer capacitor. The battery state recognition monitors the loading state of the batteries. A warning is given if the loading state falls below a threshold of the loading state required for actuating the associated brake circuit. In the case of a failure of one of the batteries the other brake circuit is still operable due to its supply with energy from the other battery which is decoupled from the first battery.

SUMMARY OF THE INVENTION

The invention proposes an electric brake system for a vehicle. The electric brake system comprises (at least) one electric brake device wherein a brake force is generated by an electric brake actuator generally of any known type. The electric brake system comprises (at least) two electric power sources, namely a capacitor-based power source and a recharging power source.

With the novel invention, it is possible to provide an electric brake system wherein the control and/or power supply is improved in particular with respect to the operational safety, the consumption of electric power, the constructional requirements and the integration into the vehicle power system.

The capacitor-based power source is a power source formed by a capacitor or at least comprising a capacitor. The capacitor-based power source supplies electric power to the electric brake actuator. The recharging power source might also be a capacitor-based power source or a power source of any different type. To mention only one non-limiting example, the recharging power source might be a chemical electric power source as a battery or an accumulator. The capacitor-based power source and the recharging power source might differ in their type, construction, their capacity, their dynamical behavior. Preferably, the capacitor-based power source is a power source acting faster than the recharging power source which means that when connecting the different power sources to a consumer as the electric brake device by the capacitor-based power source a current is supplied with a steeper increase of the current or a certain amount of electric energy can be supplied in a shorter time interval.

It has been shown that the use of a capacitor-based electric power source leads to a lot of alternative or cumulative advantages. Only a part of possible advantages is mentioned as follows:

For a power source comprising at least a capacitor, the power source is rechargeable with improved recharging characteristics, e.g. at least reduced hysteresis.

A capacitor-based power source might be able to provide electric energy with a faster (i.e. higher power) characteristic than a traditional chemical electric power source.

For a power source comprising a capacitor it might be very simple to monitor the charging level of the power source.

A capacitor-based power source might be advantageous over a chemical electric power source with respect to the costs and the operational safety.

The electric brake system furthermore comprises at least one control device. The control device comprises control logic for controlling the flow of electric energy between the recharging power source and the capacitor-based power source. For this purpose, the control device might directly be integrated into the connection between the recharging power source and the capacitor-based power source or might control another electric device arranged in the connection between these power sources. It is possible that (in a very dynamic and fast fashion) the electric brake device is supplied with electric energy from the capacitor-based power source so that the above mentioned advantages of the use of a capacitor for the electric power source can be used. However, it has been shown that solely on the basis of a capacitor it will not be possible to operate an electric brake system under the given safety regulations. Instead, also the recharging power source, in particular a chemical electric power source, can be used in combination with the capacitor-based power source. When unloading the capacitor-based power source (also within a short time interval or during a lot of subsequent brake actions within a short time interval) it is possible to recharge the capacitor-based power source from the recharging power source. The recharging power source might have a slow acting charging behavior so that it is possible to recharge the recharging power source during a long-term operation of the vehicle or to recharge the recharging power source in a loading station of a purely electrically driven vehicle or a hybrid vehicle. It is possible to use the different advantages on the one hand side of a capacitor-based power source and on the other hand side of a recharging power source as a chemical electric power source in combination.

The electric brake system might comprise a brake actuation mode wherein the electric brake device is controlled such that a desired brake force is generated, an increasing brake force is generated and/or a previously generated brake force is upheld. The brake actuation mode comprises a holding sub-mode wherein a previously generated brake force of the electric brake device is kept constant and a brake force control sub-mode wherein the brake force is controlled on the basis of the actual brake force demand.

It is generally possible that the recharging power source, the capacitor-based power source and the electric brake device are only connected in line or series (in the aforementioned order) so that there is no connection between the recharging power source and the electric brake device without interposition of the capacitor-based power source. For one proposal, the recharging power source can be directly connected to the electric brake device which is in particular not always the case but only the case in extraordinary operational states as e.g. in a failure mode. For this direct connection the recharging power source might be connected in parallel to the capacitor-based power source to the electric brake device. There might be a switching component in the parallel line for activating and deactivating this direct connection between the recharging power source and the electric brake device. For one embodiment there is a bypass line which can be selectively activated and which bypasses the capacitor-based power source for directly connecting the recharging power source to the electric brake device.

The electric brake system might comprise a monitoring device. The monitoring device monitors the charging level of the capacitor-based power source. There are a lot of different methods for monitoring the charging levels that might be used within the frame of the invention and might be integrated into a logic of the monitoring device. It is e.g. possible that the monitoring device monitors an electric property of the capacitor-based power source. For example, the monitoring device might monitor the voltage at the different plates of the capacitor of the capacitor-based power source. From a given characteristic for the energy charging level as a function of the voltage of the capacitor (said characteristic can be stored in the monitoring device), the monitoring device is able to determine the charging level from the monitored voltage. For an alternative or cumulative embodiment, the charging level of the capacitor-based power source is monitored by monitoring the flow of electric energy from the capacitor-based power source to the electric brake device and/or by monitoring the flow of electric energy from the recharging power source to the capacitor-based power source. The physical basis of this type of monitoring will be explained on the basis of the following non-limiting example:

The capacitor-based power source might have an energy storage capacity that is equal to the capacitor value $C_{uc}$ of the capacitor-based power source. By measuring the current in/out of the capacitor-based power source the status of the energy reservoir is easily monitored. The main items to measure is the energy input/output, the stored energy level, the energy storage capacity. This is easily monitored by measuring the voltage of the capacitor-based power source $V_{uc}$ and the current from and to the capacitor-based power source $i_{uc}$. The transferred energy in/out of the capacitor-based power source is $i_{uc} \cdot V_{uc}$. The storage capacity and capacitor value of the capacitor-based power source is $$C_{uc} = \frac{\int_{t0}^{t1} i_{uc} dt}{V_{uc1} - V_{uc0}}$$

where
$V_{uc0}$ is the voltage of the capacitor-based power source at time $t_0$,
$V_{uc1}$ is the voltage of the capacitor-based power source at time $t_1$ and
$\int_{t0}^{t1} i_{uc} dt$ is the integration of the current from $t_0$ to $t_1$.
The energy storage level is equal to $$E_{uc} = \frac{C_{uc} \cdot V_{uc}^2}{2}.$$

On the basis of the charging level determined by the monitoring device the control logic might take the required measures. For example, a warning might be given to the driver when falling below a low charging level. Furthermore, on the basis of the charging level the flow of energy for recharging between the recharging power source and the capacitor-based power source can be controlled for increasing the charging level of the capacitor-based power source. It is also possible that for a detected lower charging level additional consumers that are not related to the safety and to the braking are deactivated by the control logic. Furthermore, it is possible that for a smaller charging level the brake actuation of the electric brake device is adapted. In the worst case for detecting a charging level below a lower threshold, an emergency brake actuation might be triggered for stopping the vehicle to standstill. This emergency brake actuation might be caused by the electric brake device or a different brake device as e.g. a parking brake.

For one embodiment control logic is provided which initiates a supply of electric power from the recharging power source to the electric brake device. This supply of electric power might be initiated when at the same time interrupting the supply of electric power from the capacitor-based power source to the electric brake device. The recharging power source might supply electric power directly to the electric brake device or under interposition of further electric components as e.g. a brake control device. The supply of electric power from the recharging power source to the electric brake device is initiated in the following (alternative or cumulative) operational states:

The supply might be initiated when detecting a failure of the capacitor of the capacitor-based power source which might e.g. be detected on the basis of a fast decrease of the charging level of the capacitor-based power source, high currents between the capacitor plates and/or on the basis of an inappropriate recharging behavior of the capacitor-based power source.

It is also possible that the supply of electric power from the recharging power source to the electric brake device is initiated when detecting a critical extent of brake actuations per time interval.

It is also possible that the supply is initiated when detecting a low energy level of the capacitor-based power source and/or a critical changing rate of the energy level of the capacitor-based power source.

It is generally possible that the capacitor-based power source, the recharging power source and/or the electric brake device work on the same voltage level. For one embodiment a voltage converting device is interposed between the recharging power source and the capacitor-based power source, between the capacitor-based power source and the at least one electric brake device and/or a connection of the recharging power source and the at least one electric brake device (wherein it is possible that this connection is parallel to the supply by the capacitor-based power source or bypasses the capacitor-based power source). For an embodiment of this type, it is e.g. possible to use a capacitor-based power source having a nominal voltage of 24 V or 48 V whereas the recharging power source comprises a nominal voltage of more than 300 V (in particular 380 V or 570 V). Here, the voltage converting device (which might be any voltage converting device of a known type) is used for converting the voltage from one power source to the other.

As electric lines for transmitting electric power any lines, cable bundles, bus systems and the like can be used. For one embodiment electric lines between the recharging power source and the capacitor-based power source can have a lower performance than electric lines between the capacitor-based power source and the electric brake device. Here, "lower performance" might have the meaning that the electric line has a higher resistance, a smaller percentage of copper in the conducting material or the like. This embodiment bases on the observation that electric lines having a higher performance (in particular a higher percentage of copper) have a higher price. Without this necessarily being the case, the invention might base on the finding that for the "slow-acting" (i.e. lower power) recharging power source and its connection to the capacitor-based power source it is sufficient to use electric lines having a lower performance. Instead, the need of the capacitor-based power source to provide electric energy in a faster way with steep changes of the currents requires electric lines with a higher performance (in particular a higher percentage of copper in the conducting material) for the connections between the capacitor-based power source and the electric brake device.

Control logic can also be provided for controlling the flow of energy from the recharging power source to the capacitor-based power source dependent on a monitored charging level of the capacitor-based power source. To mention only one non-limiting example, the control logic might increase the flow of energy when detecting a lower charging level of the capacitor-based power source for more rapidly recharging the capacitor-based power source. Furthermore, the control logic might also control the flow of energy by limiting the current between the recharging power source and the capacitor-based power source. Here, there might be a cut-off of the current when reaching a threshold of the current.

It is possible that energy only flows in one way from the capacitor-based power source to the electric brake device. For one embodiment control logic is provided for returning electric energy to the capacitor-based power source for recharging the capacitor-based power source. Here, the returned electric energy is energy that has been recovered by the electric brake device during a brake release. Accordingly, for this embodiment the electric brake system comprises an electric brake device or electric brake actuator which can be operated in an actuation mode and a recovery mode. Here, the electric brake device or any control logic is able to switch the electric brake system between an actuation mode and a recovery mode (and vice versa).

Generally, within the electric brake system also any electric brake device might be used wherein the operational state of the electric brake device, of the electric brake actuator and the caused brake application is proportional or depends according to a given characteristic from the energization of the electric brake device or electric brake actuator. In general, here a higher brake application requires a higher energization of the brake actuator. Accordingly, here also a constant (high) brake application requires a (constant, high) energization of the brake actuator. For one embodiment an electric brake device is used which can be operated in a low energy mode. In the low energy mode, the brake application is held constant. The low energy mode might e.g. be provided by switching the electric brake device from the normal, energization-based mode for changing the brake actuation to the low energy, brake holding mode wherein the brake actuator is not energized proportional or corresponding to the characteristic for holding the brake application. Instead, a locking, fixing or holding device is actuated which under the consumption of a low energy level holds the previously achieved brake application at a constant level. In the case that a change of the brake application is required, the low energy mode and the holding or fixation mode is terminated and the control logic switches back to the normal operation of the electric brake device wherein the brake application depends on the level of energization.

According to one proposal control logic is provided which switches the electric brake device between a brake actuation mode and a recovery mode (and vice versa). In the brake actuation mode the electric brake device is controlled such that a desired brake force is generated or an increasing brake force is generated. Accordingly, in the brake actuation mode the electric brake device is used in a kind of "driving mode" for causing an actuator force for generating or increasing the brake force. Instead, in the recovery mode during a release of the electric brake device energy is recovered by the electric brake device. The recovered energy is then returned to the capacitor-based power source for recharging the capacitor-based power source. For the switching from the brake actuation mode to the recovery mode, different switching strategies can be used:

It is e.g. possible that for any partial release of the brake (e.g. due to the changing application of a brake pedal by the driver or a change of the brake actuation by a control unit or also for a brake force modulation) the recovery mode is activated as long as the brake application decreases. However, it is also possible that the recovery mode is only activated when (starting from the partial or full brake application) the brake demand is completely removed (e.g. by completely lifting the brake pedal or by a complete release signal from a brake control unit).

Following this embodiment, the aforementioned brake actuation mode might comprise two different sub-modes: In a holding sub-mode a previously generated brake force of the electric brake device is kept constant. This can be provided at a low energy mode by locking, fixing or holding the position of the brake actuator. Instead, in a brake force control sub-mode the brake force is controlled on the basis of the actual brake force demand for increasing or decreasing the brake force. Here, the actual brake force demand might be given by the driver, by a brake force modulator or an automatic brake control.

In the holding sub-mode the energization of the holding device is preferably independent on the held brake application level and chosen to be sufficient for locking, fixing or holding the position of the brake actuator. Instead, in the brake force control sub-mode the brake force depends on the energization level of the brake actuator which again depends on the actual brake force demand.

There are a lot of options for dimensioning the capacity of the capacitor-based power source. For one embodiment the capacity of the capacitor of the capacitor-based power source is dimensioned such that (in particular without any intermediate recharging from the recharging power source) after eight full-stroke applications of the electric brake device the charging level of the capacitor is not less than the charging level required to obtain a predefined security braking performance on a ninth brake application. This embodiment on the one hand transfers the requirements from the legislation ECE R13 from pneumatic brake systems to electric brake systems. On the other hand, according to this embodiment the energy required for the first eight full-stroke applications and the ninth security brake application is not provided by both the capacitor-based power source and the recharging power source but solely by the capacitor-based power source. To mention only one non-limiting example, the full-stroke application might be an application of the electric brake device which leads to a deceleration of the vehicle with at least 5 m/s$^2$, whereas for the predefined security braking performance on a ninth brake application the required deceleration is larger than 2.2 m/s² or 2.5 m/s². Here, the capacitor can be dimensioned for eight/nine brake applications for the vehicle being fully loaded. For an alternative or cumulative embodiment it is possible that the nominal loading and/or reloading energy or power level of the capacitor-based power source depends on the load of the vehicle so that the nominal energy or power level is higher for higher loads.

Within the frame of the invention, a capacitor of any type might be used for the capacitor-based power source, in particular a so-called super-capacitor or ultra-capacitor. Here, the capacitor might be formed by a single couple of capacitor plates. However, for one embodiment the capacitor is a package of a plurality of single sub-capacitors. To mention only one non-limiting example, the sub-capacitors might be capacitors of the type distributed under the label "Maxwell BCAP 0310" having a voltage per cell of 2.7 V, 309.96 Farad per cell, an energy of 1129.804 J per cell, an energy of 0.313835 Wh per cell and a weight per cell of 60 g. Here, at least 18 cells of the aforementioned type can be used as sub-capacitors of the capacitor.

Furthermore, it is possible that control logic for controlling the flow of electric energy between the capacitor-based power source and the recharging power source considers a recoverable energy level stored in the applied electric brake device. This embodiment bases on the observation that when using an electric brake device with a recovery mode the only consideration of the charging level of the capacitor-based power source contains an error: if e.g. the control only considers the charging level of the capacitor-based power source and the charging level of the capacitor-based power source is below the desired charging level the control might permit a flow of electric energy from the recharging power source to the capacitor-based power source. However, at the same time energy might be recovered from the electric brake device and returned to the capacitor-based power source. In the end this recharging of the capacitor-based power source from two sides might lead to an energy level of the capacitor being higher than the desired or nominal energy level.

For one embodiment, the control logic terminates the supply of power from the recharging power source to the capacitor-based power source if the sum of the charging level of the capacitor-based power source and the recoverable energy level stored in the applied electric brake device equals or exceeds the desired charging level or nominal energy level.

The capacitor-based power source might be used for powering any number and type of vehicle axle units and/or electric brake device of the same or different vehicle axle units. According to one proposal covered by the invention an electric brake system is used wherein for a first variant the capacitor-based power source supplies power to two electric brake devices located at different vehicle sides of the same vehicle axle unit. For one variant, two capacitor-based power sources supply power to four electric brake devices of a double axle or twin axle. Here, the different capacitor-based power sources might each power two electric brake devices located at the same vehicle sides or at different vehicle sides.

For one embodiment two capacitor-based power sources are provided. Each of the two capacitor-based power sources is associated to at least one electric brake device of a respective vehicle axle unit. The electric brake system of this type can then be operated in two different modes:

In a normal operational mode, the two capacitor-based power sources are each connected with at least one electric brake device of the respective vehicle axle unit but at the same time separated from the electric brake device(s) of the other vehicle axle unit.

Instead, in a failure mode at least one of the two capacitor-based power sources is connected to electric brake devices of both vehicle axle units. For this embodiment, it is possible that e.g. for a short-circuit in one of the capacitor-based power sources the other capacitor-based power source is able to take over the power the supply of the electric brake devices previously powered by the failed capacitor-based power source.

For one embodiment control logic is provided for switching the operational mode between a normal mode, a dynamic mode and/or a residual mode (wherein the invention also covers embodiments wherein there is only a switching between two of the aforementioned modes).

In the normal mode there is a normal brake actuation and/or a normal loading process for loading the capacitor-based power source from the recharging power source. The reloading current from the recharging power source(s) will be increased for lower energy levels in the capacitor-based power source. Here, the reloading current might depend upon the energy level in the capacitor-based power source (and the recoverable energy in the brake actuator) according to $i_{charge}=f(E_{actuator}, V_{uc})$ according to any functional or empirical function f.

In the dynamic mode the brake system is required to act faster which leads to a higher consumption of power than in the normal mode. The control logic might switch from the normal mode to the dynamic mode in particular in the case of detecting of a likelihood of a required emergency brake actuation requiring a fast brake actuation. Furthermore, the dynamic mode might also be required if a high-frequent brake force modulation is required which might be the case for a limited available wheel-road frictional force due to low-friction road, ice or snow.

In the residual mode there is no or very limited reloading energy available. In order to guarantee the requirements for a remaining number of brake applications and for saving energy of the remaining capacitor-based power source, a holding device is actuated in order to hold a previously achieved brake force.

There are a lot of options for the type of recharging power source used. For one embodiment of an electric brake system the recharging power source might be a battery (which might be the battery of the truck or bus), a fuel cell or an external main electric power supply line which might be the power supply line of a tram. There are also a lot of different options for supplying electric power to the capacitor-based power source and/or the recharging power source for reloading the same.

For one embodiment electric power is supplied to the capacitor-based power source and/or the recharging power source by at least one generator (which might e.g. be a retarder, a hub generator and the like).

As mentioned above, the capacitor-based power source might be directly connected or connected under interposition of further electric components and control devices to at least one brake actuator or the electric brake device. For the embodiment the capacitor-based power source is connected via an energy control device and a brake control device to at least one brake actuator or at least one electric brake device. Here, the energy control device might be used for controlling the energy flow and for guaranteeing that the energy flow is sufficient for providing the vehicle safety. Instead, the brake control device controls the energization of the brake actuator and/or a locking device of the brake actuator for defining the brake force.

The aforementioned electric components might be singular components connected to each other by electric lines or bus systems or might be grouped together to one or a plurality of single modules or sub-modules flanged to each other. For the electric brake system, the capacitor-based power source and a voltage converting device, an energy control device, a system control device and/or the control device can be combined into a module. This module serves for controlling at least one electric brake device associated therewith.

Any such module might be located at any position of the vehicle. For one embodiment the module is mounted to a wheel axle unit which comprises the (at least one) associated electric brake device. For a variant the module is integrated into a wheel axle unit. For this embodiment, the module might be mounted to an axle housing or might be integrated into the axle housing. For one proposal the module is mounted to a chassis of the vehicle. Here, the location where the module is mounted to the chassis is close to the wheel axle unit which comprises the associated (at least one) electric brake device. Accordingly, the distance of the module from the electric brake device is kept very small so that also electric lines for energizing the electric brake actuator are kept very short resulting in good dynamics for the brake actuation and reduced costs for the electric lines.

Generally, it is sufficient to use single control devices for one, a plurality or all of the above mentioned control functions. However, it is also possible that two redundant control devices are used for this purpose. In the case of a failure of one of the redundant control devices, the other remaining control device is able to fulfil the required functions of the failed control device. For a particular embodiment the two redundant control devices are integrated into the module.

The present invention also covers embodiments where different control devices are used in parallel for controlling the brake application of different brake actuators. For one embodiment of an electric brake system, electric brake devices of an axle are controlled by a control device which cooperates in a master-slave-interaction with a control device which controls the brake application of brake actuators of another wheel axle unit.

For one electric brake system, there are two capacitor-based power sources and/or a first control circuit and a second control circuit. The capacitor-based power sources and/or the control circuits are each connectable to the electric brake actuator (or also a plurality of electric brake actuators) for providing a redundant electric power supply and/or a redundant control. A voltage converting device is used in the electric brake system. Here, any generally known voltage converting device might be used, in particular a DC/DC converter.

Within the frame of the present invention the voltage converting device can be used for different purposes:

For one embodiment the voltage converting device connects one of the capacitor-based power sources to the recharging power source which might be a main vehicle power source, e.g. a vehicle accumulator and/or a vehicle generator. Here, the voltage converting device serves for adapting the voltage supplied by the recharging power source to the capacitor-based power source according to the needs. To mention only one non-limiting example, the vehicle power source might be a power source with a voltage of more than 300 V as in particular used for a commercial vehicle or a bus solely driven by electric power. For this example it is possible to convert the voltage of the vehicle power source by the voltage converting device to a voltage of e.g. 24 V and/or 48 V which in this case is the nominal voltage of the at least one capacitor-based power source of the electric brake system.

For one variant the voltage converting device connects one of the capacitor-based power sources to another capacitor-based power source. In this case one of the capacitor-based power sources might be directly powered by the vehicle power source without any voltage conversion. The other capacitor-based power source (having a different nominal voltage) can then be powered by the first mentioned capacitor-based power source via the voltage converting device. However, for this variant also an embodiment is covered wherein the vehicle power source is connected to one of the capacitor-based power sources via a voltage converting device, whereas also this capacitor-based power source is connected to the other capacitor-based power source via an additional voltage converting device.

It is possible that in the electric brake system the two capacitor-based power sources have the same nominal voltages. However, for a preferred embodiment one of the capacitor-based power sources has a lower nominal voltage than the other capacitor-based power source. To mention a non-limiting example, one capacitor-based power source might have a nominal voltage of 48 V or 24 V whereas the other capacitor-based power source might have a nominal voltage of more than 300 V. The different nominal voltages might serve for different purposes. It is e.g. possible that the capacitor-based power source having the higher nominal voltage is used during normal operation of the electric brake system whereas the capacitor-based power source having the lower nominal voltage is only used in the case of a power-failure of the other capacitor-based power source (or vice versa). Here, the capacitor-based power source having the lower nominal voltage can then be used with a degraded function which might be

- a blocking of the vehicle wheel(s) with or without antiskid function during a driving mode or
- a blocking of the wheel(s) in a parking situation and the like.

It is possible that in the electric brake system the electric brake actuator generates an actuating force which is directly or indirectly transferred to the brake element, in particular the brake pad, so that the brake force at the brake element corresponds to or is proportional or dependent by any dependency on the actuating force of the brake actuator. Here, a transmission or brake lever can be interposed between the electric brake actuator and the brake element as the brake pad. However it has been shown that for some embodiments it can be advantageous to use a mechanical self-enforcing mechanism in the electric brake device (cp. e.g. EP 1 977 134 B1, corresponding to U.S. Pat. No. 7,815,021 B2, or US 2013/0008749 A1 disclosing a mechanical self-enforcing mechanism using ramps or other self-enforcing mechanism used for brake devices according to the prior art). These self-enforcing mechanisms can be used for generating large brake forces with small actuating forces and/or for creating a nonlinear force transfer characteristic between the actuating force and the brake force created by the brake element.

For the embodiment of the electric brake system a "conventional" electric brake device can be used. The electric brake device comprises a plunger which is mechanically connected to a brake element as a brake pad for biasing the brake element. For this embodiment a transmission unit comprising a rotating brake lever is interposed between the electric brake actuator and the plunger. Here, the rotating brake lever can be used for redirecting the actuating force to the force biasing the plunger and/or for increasing or decreasing the force or modifying the force transfer characteristic between the electric brake actuator to the plunger as desired.

Generally, within the frame of the present invention any type of capacitor-based power source can be used. For one embodiment, at least one of the capacitor-based power sources is a power source named "ultra capacitor" in the market (cp. also the patent applications and patents including "ultra capacitor" or "ultra-capacitor" in the title). The use of an ultra capacitor as a capacitor-based power source leads to a power supply with reduced requirements for maintenance and/or exchange, decreased costs and/or increased safety. The invention covers embodiments wherein a capacitor-based power source is solely formed by a capacitor, whereas for different embodiments also covered by the invention the capacitor-based power source comprises both a capacitor and an accumulator integrated into a circuit for providing the power to the electric brake actuator.

It is also possible that the electric brake actuator comprises windings which are biased by both capacitor-based power sources. However, for one proposal an electric brake actuator having first and second windings can be used. When using a first capacitor-based power source (in particular during normal operating states), the first capacitor-based power source supplies the first windings of the electric brake actuator via a first electric control circuit with electric power. If there is an abnormality of the supply of the first windings from the first capacitor-based power source, the second capacitor-based power source or the recharging power source is activated. In this case, the second capacitor-based power source or the recharging power source supplies the second windings of the electric brake actuator (via the first power supply circuit or a different, second power supply circuit) with power. Here, the different windings can be dimensioned specifically for the different operating conditions, namely the first windings for the normal operating states and the second windings for the abnormal operating states, e.g. for an emergency brake actuation, a parking of the vehicle and the like. The connection of the electric brake actuator to the different capacitor-based power sources or the recharging power source in the aforementioned different operating states via two different power supply circuits is in particular used in connection with capacitor-based power sources and/or the recharging power source having different nominal voltages.

The invention covers electric brake systems wherein different windings of the electric brake actuator are not used together in one and the same operating states so that the different windings are used as alternatives. However, according one embodiment of the invention the electric brake system comprises at least one control unit. The at least one control unit comprises control logic for controlling at least one control circuit for activating a so-called "burst mode". In a "burst mode" the different windings of the electric brake actuator are energized at the same time so that the effects and the forces generated by these windings sum up. Here, it is possible that the two windings are powered by one and the same capacitor-based power source (via one single control circuit or two separate control circuits and/or power supply circuits) or that the windings are powered by different capacitor-based power sources (and associated control circuits and/or power supply circuits).

For an embodiment also consumers which do not have an impact on the brake function are supplied with electric power by one of the capacitor-based power sources of the electric brake system. The electric brake system might comprise a control unit having control logic for deactivating these consumers. Here, the control logic is designed such that the consumers are deactivated dependent on the energy loading level of the capacitor-based power sources. If for example an energy loading level of a capacitor-based power source falls temporarily or for a given time span below a threshold, the consumers are deactivated in order to guarantee that the remaining energy level of the capacitor-based power source is sufficient for providing the required brake performance at least for a minimum number of brake actuations, for an emergency brake actuation or for a parking brake actuation. Said in different words, on the basis of this embodiment for a low energy level it is possible to give a higher priority to the components involved with the provision of the brake function than the consumers not involved with the brake function.

Generally, it is possible that the mentioned power sources of the electric brake system are independent on a power source of the commercial vehicle (e.g. a vehicle accumulator used for driving the electric motor of the vehicle and/or a generator of the vehicle). However, according to one embodiment it is suggested that the recharging power sources is a vehicle accumulator which is used for supplying power to a drive aggregate of the vehicle. In this way it is possible to reduce the number of power sources required in the vehicle.

The first capacitor-based power source can (solely) be used in normal operating states. Here, the first capacitor-based power source is connected to two separate electric brake actuators by two parallel power supply lines. In this case, an optional voltage converter and a control unit are integrated into each of the two parallel power supply lines. The second capacitor-based power source is used (only) in the case of an abnormality in the first power supply circuit. Here, the second capacitor-based power source is connected to the control units which are integrated into the two parallel power supply lines for the first capacitor-based power source and to the two separate electric brake actuators. Here, the connections between the second capacitor-based power source and the control units might be direct connections, connections with an integrated diode and/or connections which do not comprise any voltage converter. It is possible that for this embodiment for the supply of power from the first capacitor-based power source in normal operating states and from the second capacitor-based power source in the case of an abnormality the same power supply lines from the control units to the brake actuators are used.

It is possible that a module is used in the electric brake system. Here, the module might be formed with a single housing or with a number of submodules flanged with each other, wherein mechanical connections and/or electric connections in particular for transferring control signals and for an energy transfer are formed by flanges of the submodules. It is possible that the electric connections are automatically connected by the assembly of the submodules.

The module might include the following (cumulative or alternative) components:
  a) The module might contain one of the aforementioned electric capacitor-based power sources (or also two capacitor-based power sources).
  b) The module might comprise at least one control unit.
  c) The module might comprise at least one voltage converting device.

d) The module might comprise at least one outlet port.
e) Furthermore, it is possible that the module comprises at least one inlet port for a brake signal from a service brake actuation unit (e.g. a brake pedal) and/or a parking brake actuation unit (e.g. a hand brake actuation unit), a power supply from a power source of the vehicle (namely the vehicle accumulator and/or generator), a control signal for a first brake actuator and/or a second brake actuator and/or a power supply for the first brake actuator and/or the second brake actuator.

A module formed in this way contains the required components and forms a semi part of the electric brake system. A semi part can be stored by the customer in an efficient way, can be provided by the manufacturer at reduced cost and provides an assembly with decreased assembly effort.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an electric brake device, an electric brake actuator or a control unit is mentioned, this is to be understood such that there is exactly one electric brake device, electric brake actuator or control unit or there are two or more electric brake devices, electric brake actuators or control units.

Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

In the following, the invention is further explained and described with respect to preferred exemplary embodiments illustrated in the drawings.

DETAILED DESCRIPTION

Figure 1:
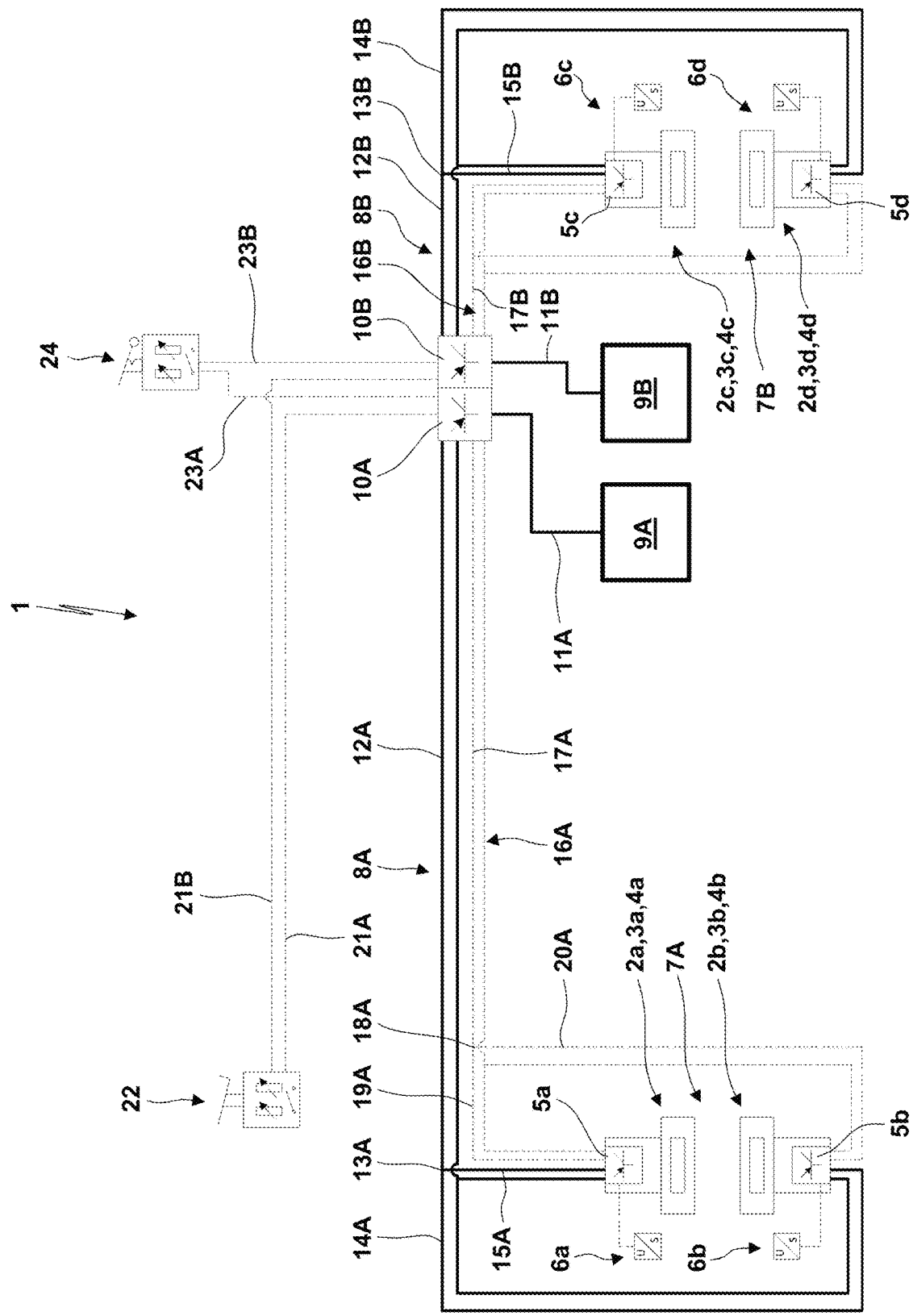
FIGS. 1 to 3 show different schematic diagrams of an electric brake system of a vehicle.

In the figures the same reference numerals have been used for components having the same or comparable functions and/or designs. If in one embodiment the same components are used a number of times, these components are labelled with the same reference numerals and additional distinguishing letters a, b, c, . . . or A, B. The use of a reference numeral without a distinguishing letter a, b, c, . . . or A, B in the following specification might refer to all of the components with this reference numeral or only to one single component or any number of these components. If for one embodiment the same components or groups of components are used a number of times, in some cases only one of these components or groups of components will be described. However, in this case the corresponding applies to the other components or groups of components.

FIG. 1 shows an electric brake system 1. The electric brake system 1 comprises four brake devices 2a-2d. The brake devices 2a-2d each comprise a brake actuator 3a-3d. The brake actuators 3a-3d generate an actuating force which is transferred by a suitable transmission and/or self-enforcing mechanism to a brake element 4a-4d such as a brake pad for pressing the brake element towards another brake element as a brake disc which rotates with the vehicle wheel. The brake devices 2a-2d each comprise a control unit 5a-5d and a sensor 6a-6d sensing the bias of the brake device 2a-2d. It is possible that the sensor 6 senses a displacement of the brake pad towards the brake disc or an actuating force of the brake device 2a-2d or the brake actuator 3a-3d.

The brake devices 2a-2d form different groups 7A, 7B. Here, the different brake devices 2a, 2b [or 2c, 2d] of group 7A [or group 7B] might e.g. be associated with the wheels on each side of an axle of the vehicle, wheels on the same vehicle side or one single brake with the brake devices 2a, 2b [or 2c, 2d] cumulatively acting upon one and the same brake disc.

The brake devices 2 of a group 7A, 7B are supplied with electric power by a power supply circuit 8A, 8B. In FIG. 1 power supply lines of the power supply circuits 8A, 8B are shown with solid lines. Each of the power supply circuits 8A, 8B comprises a capacitor-based power source 9A, 9B.

In the following, only one of the power supply circuits 8A will be described, whereas the same applies to the other power supply circuit 8B:

The power supply circuit 8A comprises a capacitor-based power source 9A. The capacitor-based power source 9A is connected to a control unit 10A by a supply line 11A. The control unit 10A transfers the power delivered from the capacitor-based power source 9A via the supply line 11A to a supply line 12A. At a branching point 13A the supply line 12A branches to two supply line branches 14A, 15A. The supply line branches 14A, 15A are connected to a supply port of the associated brake device 2a, 2b for a power supply of the same. The person with skill in the art will understand that the supply lines 11, 12 and the supply line branches 14, 15 do not necessarily form one single unidirectional line but might also form a bidirectional line or double-line for forming a closed electric circuit. In the electric power supply circuit 8A the control unit 10A comprises control logic for controlling the transmission of power from the capacitor-based power source 9A with the option to control the current and/or voltage, to interrupt the power transfer and the like.

For the embodiment shown in FIG. 1 the control units 10A, 10B of the two power supply circuits 8A, 8B form a unit. Here it is possible that the control units 10A, 10B exchange operating data and sensed data as well as their control strategy via a suitable interface.

Without this being shown in FIG. 1, as an option it is possible that the control unit 10A (at least in some operational states) also supplies electric power to the other power supply circuit 8B and/or the control unit 10B (at least in some operational states) also supplies electric power to the other power supply circuit 8A.

Furthermore, the electric brake system 1 comprises control circuits 16A, 16B for the control of the brake devices 2 of the different groups 7A, 7B. In the figures the control lines of the control circuits 16A, 16B are shown with dashed lines. The control circuits 16 will now be described for the control circuit 16A for the brake devices 2a, 2b of group 7A. However, the same applies for the other control circuit 16B:

A control signal is generated by the control unit 10A. The control signal is transmitted via a control line 17A and a branching point 18A to control line branches 19A, 20A. The control line branches 19A, 20A are each connected to a control port of the associated brake device 2a, 2b.

Without this being shown in FIG. 1, as an option it is possible that the control unit 10A (at least in some operational states) also controls the control circuit 16B and/or the control unit 10B (at least in some operational states) also controls the control circuit 16A.

Control unit 10A is furthermore connected by an actuating line 21A to a service brake actuation unit 22. Furthermore, the control unit 10A is connected by an actuating line 23A to a parking brake actuation unit 24. For the shown embodiment the service brake actuation unit 22 is a foot pedal unit comprising two sensors converting the actuation and movement of a foot pedal to an actuation signal transferred by the redundant actuation lines 21A, 21B to the control units 10A, 10B. The actuation of the parking brake actuation unit 24 leads to redundant actuation signals for the actuating lines 23A, 23B. On the basis of the actuation signals received by the control units 10A, 10B upon actuation of the service brake actuation unit 22 and/or the parking brake actuation unit 24 by the driver, the control units 10A, 10B control the power transmitted by the power supply circuits 8A, 8B and also control the control signals in the control circuits 16A, 16B. The control circuits 16A, 16B can at least partially be formed by a communication network as CAN or Flexray. It is also possible that the power supply circuits 8A, 8B are integrated into the communication network.

For the embodiment shown in FIG. 1 the capacitor-based power sources 9A, 9B have the same nominal voltage, in particular 24 V. Furthermore, the brake devices 2a-2d are preferably formed with a self-enforcing mechanism. The capacitor-based power sources 9A, 9B are recharged by an external recharging power source (here not shown) which might be a vehicle accumulator, a generator, a retarder, a hub generator, an electric motor used for driving the vehicle which can be used in a recuperation mode and the like.

However, for a modified embodiment it is also possible that the accumulators 9A, 9B have different nominal voltages. Here, for one embodiment the accumulator 9A has a nominal voltage of 24 V, whereas the accumulator 9B has a voltage of 380 V or 570 V. Furthermore, the brake devices 2a-2d do not necessarily comprise a self-reinforcing mechanism. Instead, the brake actuator 3 may actuate the brake lever of a traditional brake device. Also two power supply circuits 8A, 8B and control circuits 16A, 16B can be used. Preferably, one electric power supply circuit 8A and the associated control circuit 16A are used during normal brake operation, whereas the other power supply circuit 8B and the control circuit 16B are only used in the case of an abnormality, a failure or an emergency. Preferably, the power supply circuit 8B and the control circuit 16B using the capacitor-based power source 9B with the higher nominal voltage is used during the normal operation.

As explained before, it is also possible that both the power supply circuits 8A, 8B and the control circuits 16A, 16B can each be used in a redundant fashion for supplying power from one of the capacitor-based power sources 9A, 9B to the brake devices 2a-2d and for controlling the power flow to the brake devices 2a-2d. In this case the control units 10A, 10B may each be connected by supply lines 11, 12 and supply line branches 14, 15 to each of the brake devices 2a-2d. In a corresponding way for this embodiment the control circuits 16A, 16B can each be connected by the control line 17 and control line branches 19, 20 to each of the brake devices 2a-2d. Accordingly, for this embodiment the control lines and supply lines differ from those shown in FIG. 1.

An embodiment of this type requires that it is possible to drive each of the brake devices 2 with a power supply by the capacitor-based power source 9A or with a power supply by the capacitor-based power source 9B.

The handling of different nominal voltages of the capacitor-based power sources 9A, 9B for driving the brake devices 2 can be provided in different ways:

a) It is possible that two different control circuits are used for driving the brake actuators 3 of the brake devices 2. When switching the power supply from one capacitor-based power source 9A to the other capacitor-based power source 9B, the control units 10A, 10B cause a switch from one control circuit used for the provision of power by the capacitor-based power source 9A to the use of a control circuit used for the supply of power from the capacitor-based power source 9B. It is possible that the control circuits modify the energization of the brake actuator 3 in a way such that by the same control signals in the control circuits 16A, 16B the same brake force is generated. However, it is also possible that also the control strategy in the control circuits 16A, 16B is switched or depends on the switching state of the two control circuits.

b) It is also possible that the redundant power supply circuits 8A, 8B and control circuits 16A, 16B cooperate with different windings 51, 52 of the brake actuator 3. Accordingly, when using the first capacitor-based power source 9A, the first power supply circuit 8A and the first control circuit 16A, the first windings 51 of the brake actuator 3 are used. When switching the power supply to the capacitor-based power source 9B, the power supply circuit 8B and the control circuit 16B are used together with the other windings 52 of the brake actuator 3. Here, the number of windings and the cross-sectional area of the windings 51, 52 can be adapted to the different nominal supply voltages of the capacitor-based power sources 9A, 9B.

c) It is also possible that the same windings of a brake actuator 3 are used with a power supply from the capacitor-based power sources 9A, 9B with different nominal voltages when converting the voltage of at least one of the capacitor-based power sources 9A, 9B (upstream or downstream from the control units 10A, 10B) by a voltage converting unit as a DC/DC converter.

Differing from the aforementioned embodiments at least one of the power sources 9A, 9B might also be formed by an existing accumulator of the vehicle. In particular, the power source 9B might have the higher nominal voltage, in particular a voltage of more than 300 V, and might be an accumulator used for powering a drive aggregate of the vehicle.

Figure 2:
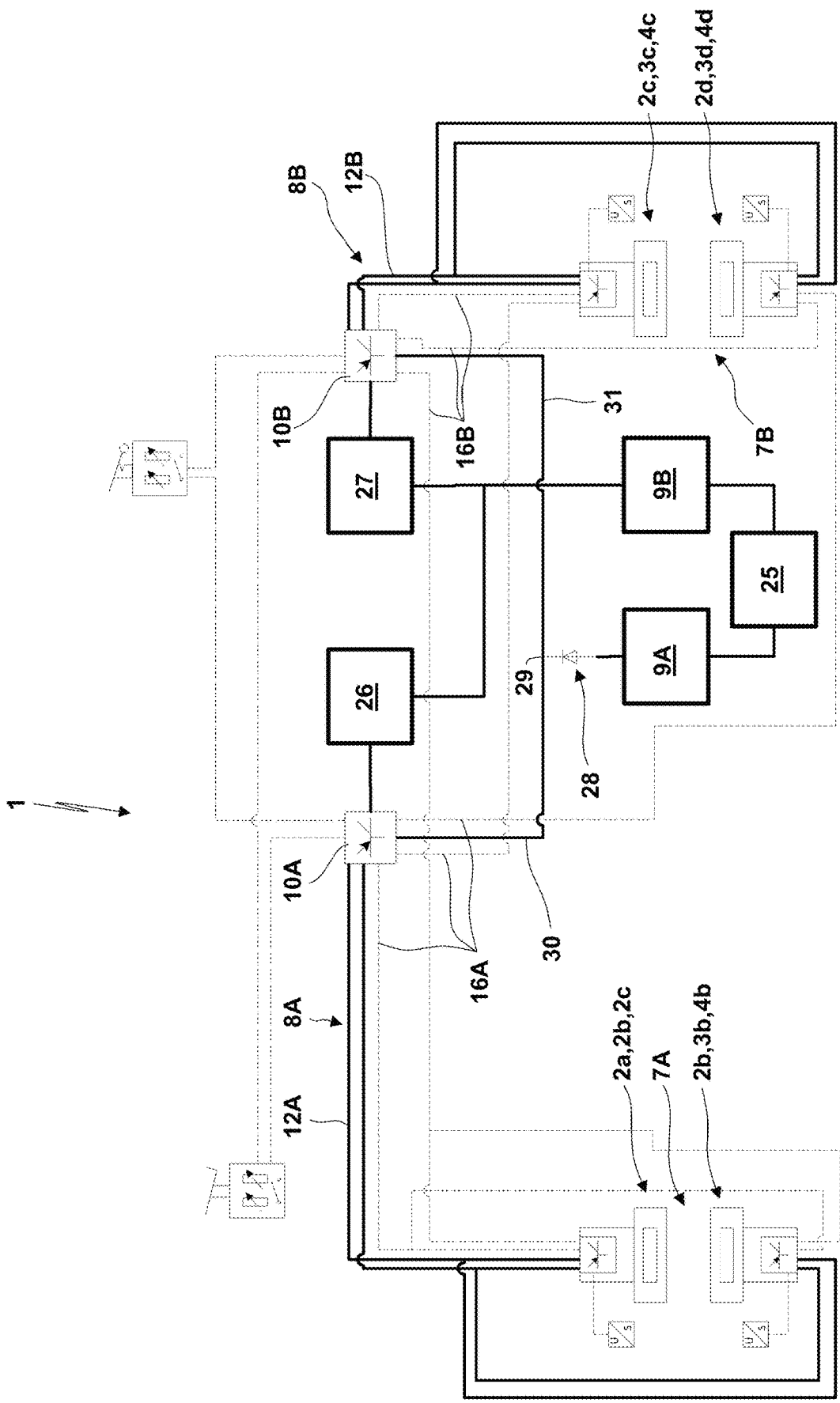

FIG. 2 shows an embodiment comprising two capacitor-based power source 9A, 9B having different nominal voltages. Preferably, the capacitor-based power source 9A has a nominal voltage of 24 V, whereas the capacitor-based power source 9B has a nominal voltage of more than 300 V. The capacitor-based power source 9B forms the main brake power supply. The capacitor-based power source 9B is preferably powered by the vehicle power system, in particular a generator and/or a vehicle power source which forms a recharging power source (here not shown). The capacitor-based power source 9B is connected by a voltage converting device 25 (in particular a DC/DC converter) to the capacitor-based power source 9A. Accordingly, it is possible to load the power source 9A via the voltage converting device 25 by the power source 9B (and/or vice versa). For the powering of the electric brake system 1 during the normal operating mode via two voltage converting devices 26, 27 (in particular DC/DC converters; having each a nominal output voltage of 48 V) the power source 9B supplies the control units 10A, 10B with electric power. Instead, in the case of an abnormality the control units 10A, 10B are powered by the power source 9A, here via a diode 28, a branching point 29 and supply line branches 30, 31. If the power source 9A has a lower nominal voltage than the output voltage of the voltage converting devices 26, 27, it is possible that during the abnormal operation of the electric brake system 1 only a degraded function is provided. According to FIG. 2, the power supply circuits 8A, 8B each power all of the brake devices 2 by suitable supply lines and line branches between the control units 10a, 10b and the brake devices 2. Also in the control circuits 16A, 16B the control units 10A, 10B are connected by control lines and control line branches to each of the brake devices 2.

Figure 3:
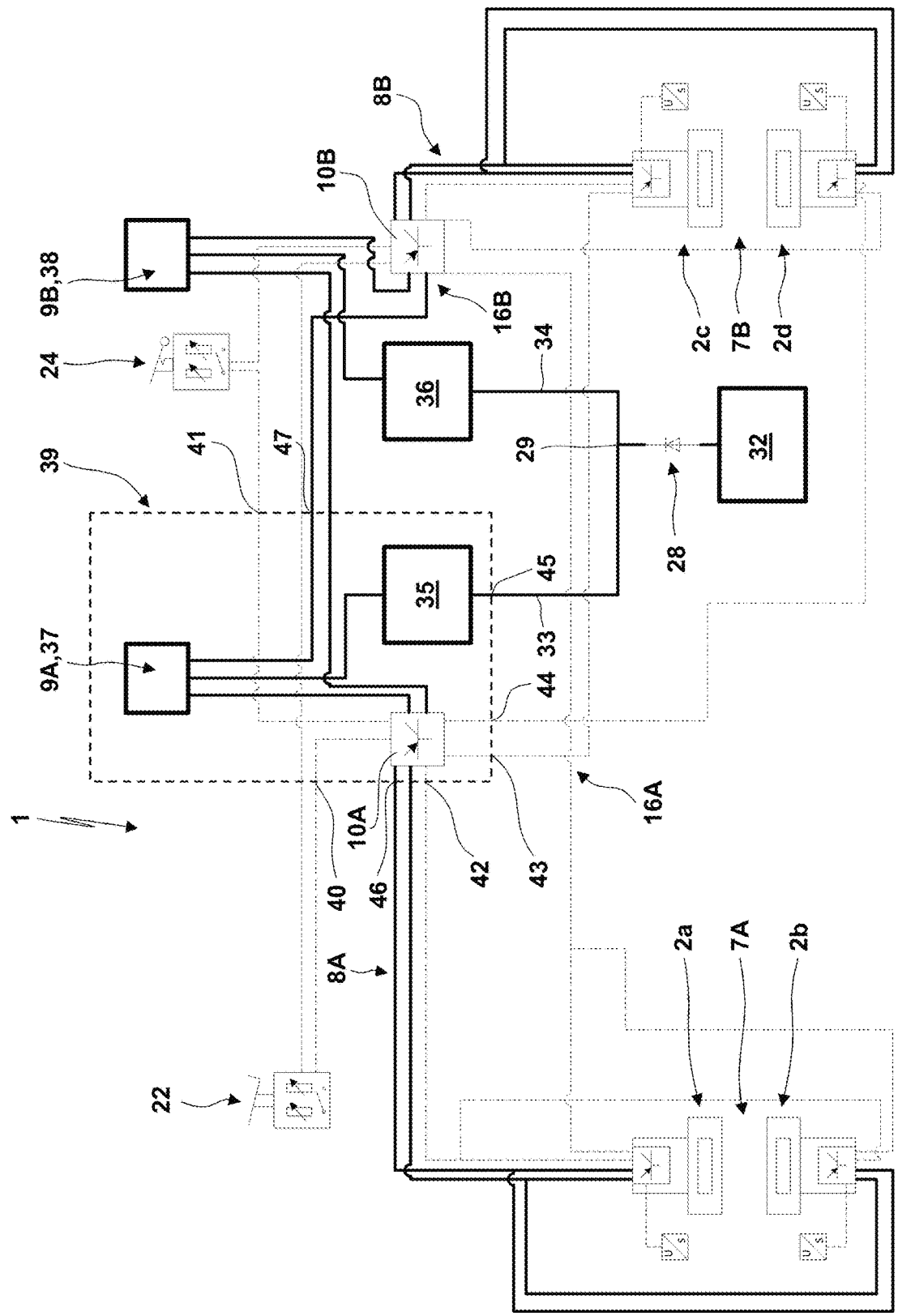

FIG. 3 shows an embodiment wherein the electric brake system 1 is powered by a recharging power source 32 which might be the main vehicle supply, the generator of the vehicle or the vehicle drive accumulator. The recharging power source 32 might have a nominal voltage of 24 V or more than 300 V. Via a diode 28, a branching point 29, supply line branches 33, 34 with voltage converting devices 35, 36 located therein, the recharging power source 32 powers the capacitor-based power sources 9A, 9B. Preferably, the capacitor-based power sources 9A, 9B are powered by a voltage of 48 V at the output of the voltage converting devices 35, 36. The capacitor-based power sources 9A, 9B are ultra-capacitors 37, 38. The capacitor-based power sources 9A, 9B are each connected to both of the control units 10A, 10B for a redundant power supply. The control unit 10A comprises a first power supply circuit 8A for powering the group 7A of brake devices 2a, 2b. The control unit 10B powers the power supply circuit 8B for powering the brake devices 2c, 2d of the group 7B. The control unit 10A controls all of the brake devices 2a-2d via the control circuit 16A, whereas the other control unit 10B controls all of the brake devices 2a-2d via the other control circuit 16B. The capacitor-based power sources 9A, 9B are preferably used for intermediate storage of energy from the recharging power source 32. The amount of energy stored in the capacitor-based power sources 9A, 9B is preferably sufficient for a specified number of full brake actions of the vehicle and/or for applying the brakes in a parking situation for a given inclination of the road also in the case of a failure of the recharging power source 32.

For a preferred embodiment, a module 39 (see dashed schematic housing) contains some of the components of the electric brake system 1. It is possible that the module 39 is mounted to the axle unit or an axle housing or a vehicle frame close to the axle. For the embodiment shown in FIG. 3, the module 39 includes the control unit 10A, the voltage converting device 35 and the capacitor-based power source 9A. An identical module might include the control unit 10B, the voltage converting device 36 and the capacitor-based power source 9B. The module 39 comprises an input port 40 for a brake actuation signal from the service brake actuation unit 22, an input port 41 for a brake actuation signal from a parking brake actuation unit 24, output ports 42, 43, 44 for control signals of the control circuit 16A for the brake devices 2a-2d, an input port 45 for a connection via the supply line branch 33 and the diode 28 to the recharging power source 32, an output port 46 for the power supply of the power supply circuit 8A and an output port 47 for a power supply for the control unit 10B.

Figure 4:
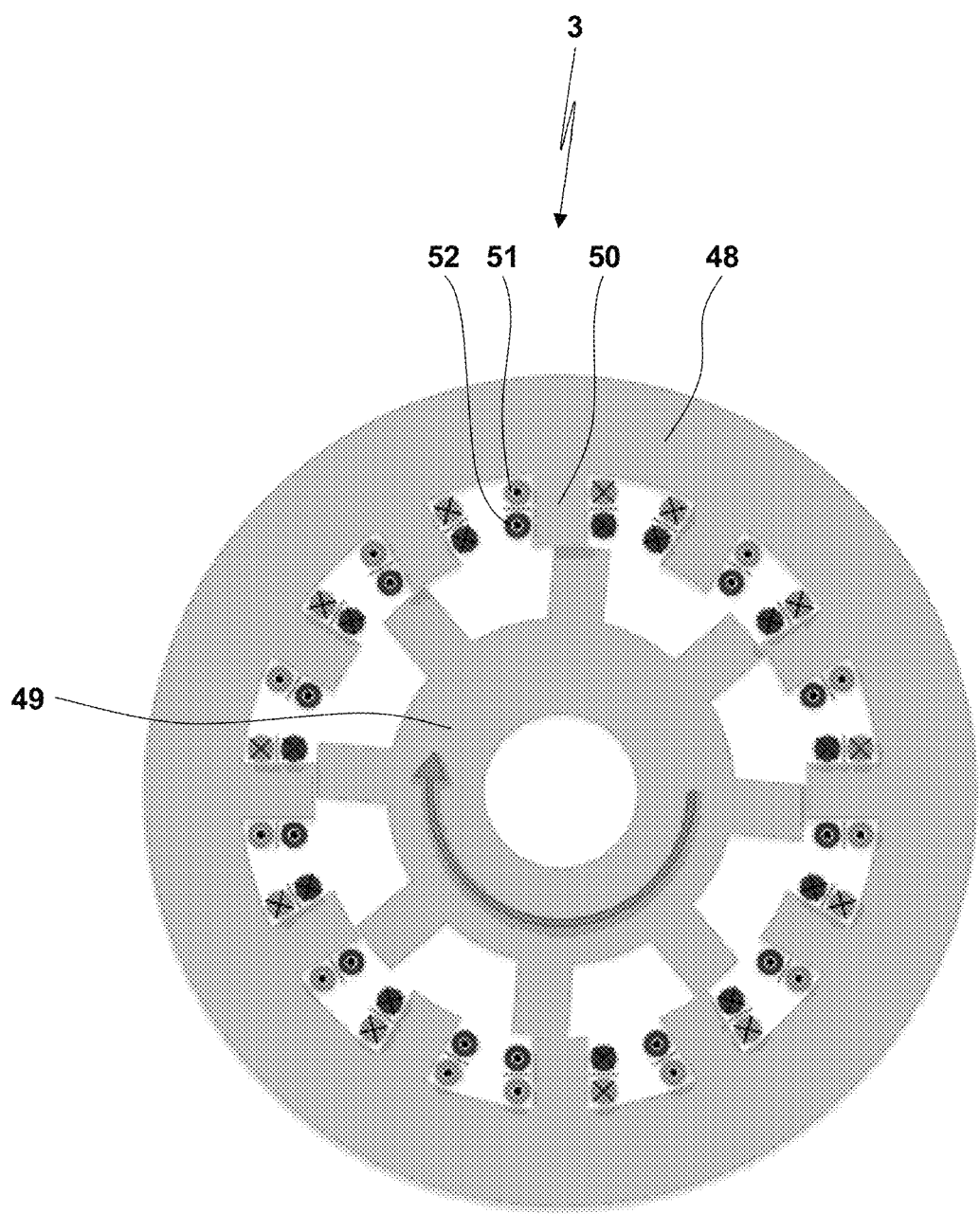
FIGS. 4 and 5 are schematic drawings showing different principles for the design of a stator of an electric brake actuator.

FIG. 4 schematically shows a brake actuator 3 comprising a stator 48 and a rotor 49. The rotor 49 comprises permanent magnets. The stator 48 comprises windings 51, 52 for generating a rotating magnetic field. Here, for the embodiment shown in FIG. 4 the rotor 49 comprises cores 50 evenly distributed in circumferential direction. The cores 50 comprise electrically insulated windings 51, 52 (in FIG. 4 for simplification purposes the windings 51, 52 each only have one winding; however, in practice each of the windings 51, 52 has a plurality of windings). Accordingly, by alternative energization of the windings 51, 52 there are two options for driving the rotor 49. The different windings 51, 52 are associated with different power supply circuits 8A, 8B and/or control circuits 16A, 16B. So, when energizing the power supply circuit 8A and the control circuit 16A, the rotor 49 can be driven by the windings 51, whereas the power supply circuit 8B and the control circuits 16B are not energized. When switching from the power supply circuit 8A and the control circuit 16A to the power supply circuit 8B and the control circuit 16B, the rotor 49 can be driven by the windings 52. Accordingly, for the embodiment schematically shown in FIG. 4 there is a shared magnetic redundancy with full redundant magnetic power for the provision of an actuation torque, wherein redundant motor windings 51, 52 create magnetic forces in the same magnetic circuits of the brake actuator 3.

Figure 5:
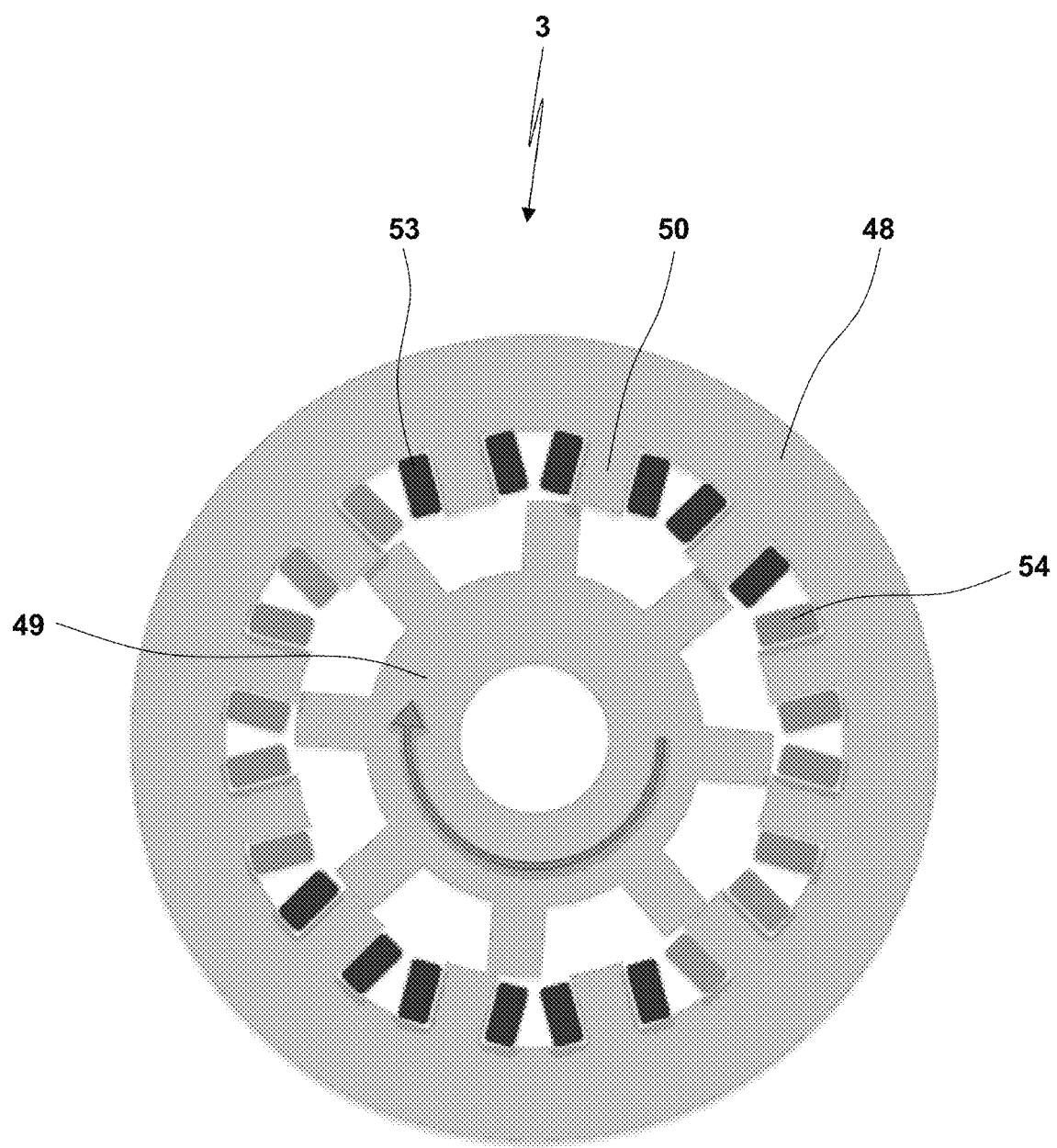

Instead, FIG. 5 shows an embodiment with a splitted magnetic redundancy with half redundant magnetic power and resulting motor torque. Here, redundant windings 53, 54 create magnetic forces in separate magnetic circuits. According to FIG. 5, different sets of cores 50 are evenly distributed in circumferential direction of the stator 48. Here, one set of cores comprises the windings 53, whereas the other set of cores comprises the windings 54.

For the embodiments shown in FIGS. 4 and 5, dependent on the control in the control circuits 16A, 16B (and the power supply circuits 8A, 8B) it is possible that during the normal mode the brake actuator 3 is driven by simultaneous energization of both windings 51, 52 or 53, 54. Instead, in the case of a power failure in one of the control circuits 16A, 16B and/or a power source 9A, 9B it is possible to drive the brake actuator 3 solely with one of the windings 51, 52 or

53, 54. However it is also possible that during the normal operation the brake actuator 3 is driven by one of the windings 51, 52 or 53, 54, whereas in the case of an abnormality the brake actuator 3 is driven by the other of the windings 51, 52 or 53, 54.

The brake actuator 3 might be a brushless permanent magnet motor with an axial magnetic air gap comprising windings 51, 52 on both sides of a rotor which might also be named a "pancake rotor". Furthermore, a brushless permanent magnet motor with radial magnetic air gap and concentrated windings can be used. It is also possible to use a brushless non-permanent magnet motor as a switched reluctance motor with concentrated windings.

Figure 6:
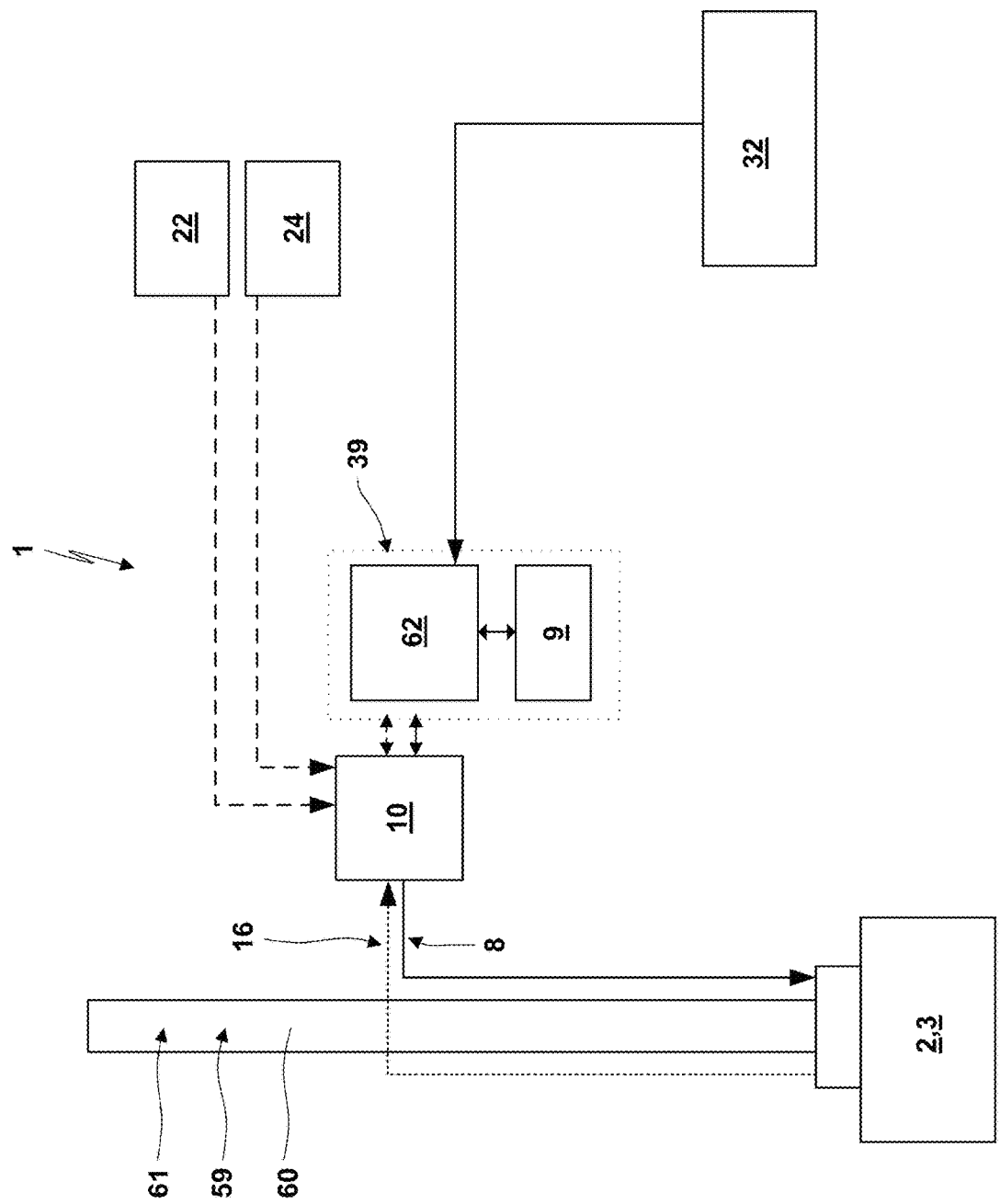
FIGS. 6 to 15 show further schematic diagrams of an electric brake system of a vehicle.

FIG. 6 schematically shows another electric brake system 1. The vehicle comprises an axle 61 with a wheel axle unit 59 which comprises a wheel axle housing 60. For a simplification of the drawing, here further wheel axle units of the vehicle are not shown and only one wheel end of the wheel axle unit 59 with the associated brake device 2 is shown. The recharging power source 32 might e.g. be a truck battery or bus battery, a similar power source at another axle, a generator mounted somewhere in the system, an electric motor used for driving the vehicle and also used in a recuperation mode for recharging the capacitor-based power source 9 or a hub-mounted generator.

In FIG. 6 the axle module 39 comprises the control unit 62 and a capacitor-based power source 9. The axle module 39 comprises a recharging port connected to the recharging power source 32. Furthermore, the axle module 39 comprises a port for transmitting power between the control unit 10 and the control unit 62 and another port for exchanging control signals between the control units 10, 62. For the shown embodiment the brake control unit 10 is interposed between the brake device 2 and the axle module 39 with line connections there between. However, for a different embodiment it is also possible that the brake control unit 10 is integrated into the axle unit 39 or attached to or integrated into the brake device 2. The brake control unit 10 might comprise one single control unit/CPU or at least two redundant brake control units/CPUs. The brake device or axle unit 59 might comprise a wheel speed sensor and/or a pad wear sensor. The measurement signals of these sensors are communicated and fed to the brake control unit 10. The axle module 39 can be attached to or integrated into the wheel axle unit 59, preferably close to the wheel end or in the lateral center of the axle 61. The brake control unit 10 comprises control logic for controlling the energization of the brake device 2 and its brake actuator 3. The brake control unit 10 might also comprise control logic for switching between the above mentioned brake application mode, the holding mode and the release mode, wherein the brake control unit in this case also provides the energization for the brake application in the application mode, the switching to the holding mode and the energization of any holding device and the switching to a recharging in the release mode.

The brake control unit 10 receives both the signals from the service brake actuation unit 22 (in particular a foot brake pedal) and the parking brake actuation unit 24 (in particular a hand brake lever or switch). Furthermore, the brake control unit 10 receives the control signals from the control unit 62.

The control unit 62 which is integrated into the axle module 39 might be a control unit for controlling the brake and/or a control unit for controlling the flow of electric energy between the recharging power source 32, the capacitor-based power source 9 and/or the brake control unit 10. Differing from the shown embodiment, the axle module 39, the brake control unit 10, the capacitor-based power source 9 and/or the recharging power source 32 may also communicate and share the decisions or power control or brake control with other power sources, control units, brake control units and/or brake devices 2, in particular related to a different wheel axle.

Figure 7:
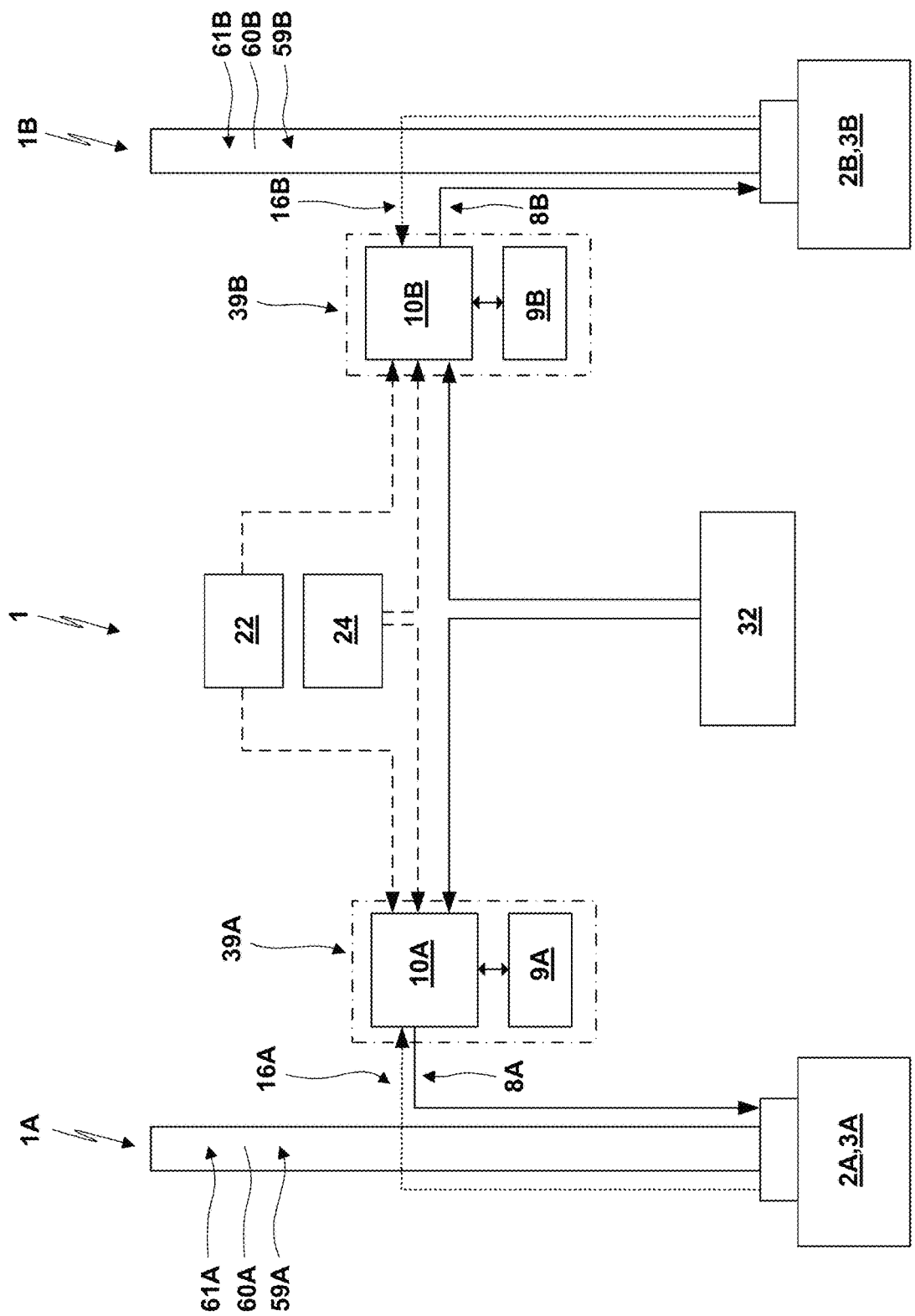

FIG. 7 shows an embodiment generally corresponding to the embodiment of FIG. 6. However, here the components of the brake system 1 are shown for two wheel axles 61A, 61B. Axle modules 39A, 39B are related to a respective wheel axle 61A, 61B. Furthermore, differing from the embodiment of FIG. 6 the functions of the control units 10, 62 of FIG. 6 are here fulfilled by the brake control unit 10. Whereas both brake sub-systems 1A, 1B related with the two axles 61A, 61B are formed separately from each other without any linkage there between, both wheel axle modules 39A, 39B are recharged by one and the same recharging power source 32.

Figure 8:
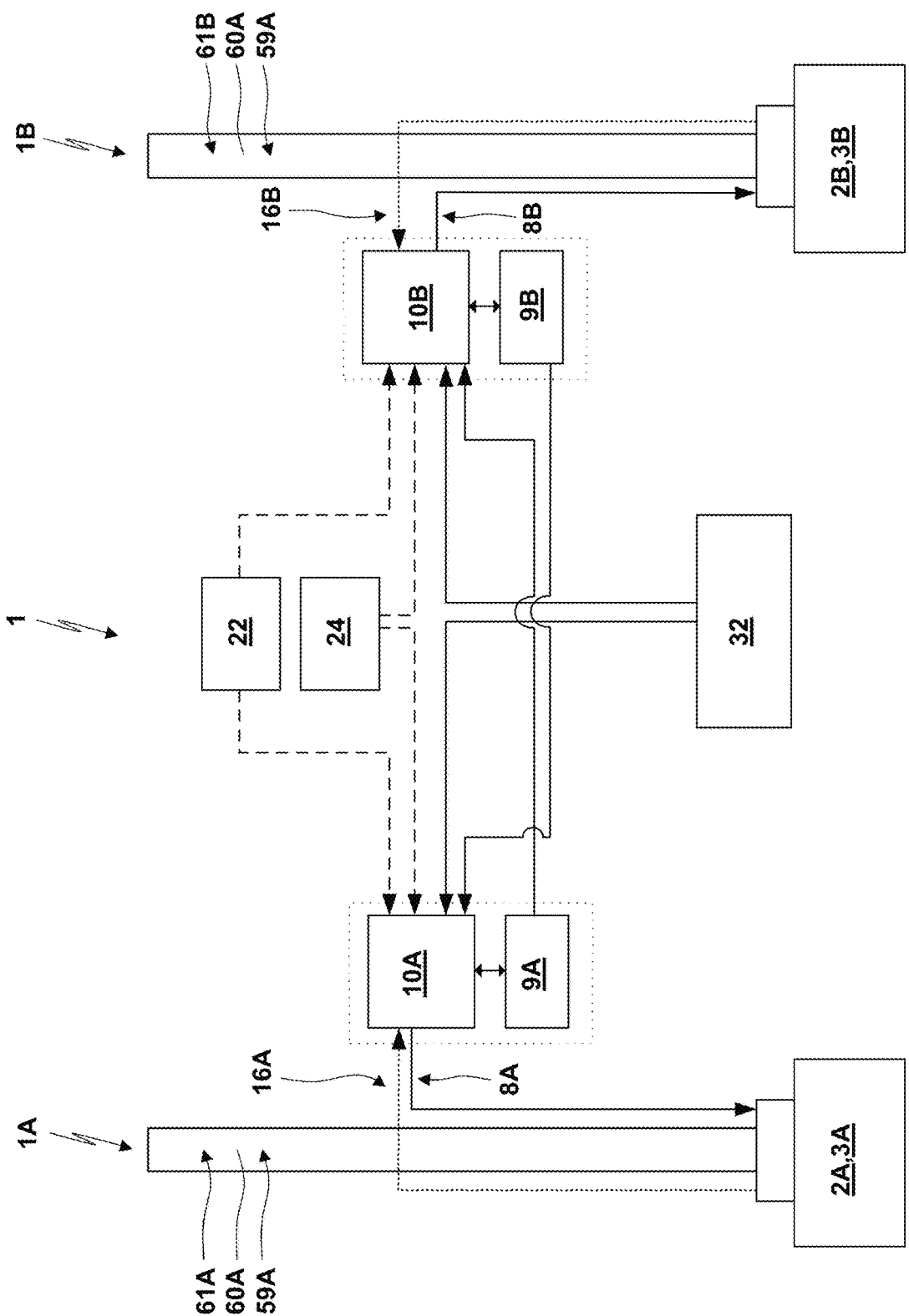

The embodiment of FIG. 8 generally corresponds to the embodiment of FIG. 7. However, here the brake sub-systems 1A, 1B are not formed separately from each other. Instead, here the capacitor-based power source 9A is always or in a failure mode used both for the power supply of the associated brake control unit 10A and also for a power supply of the brake control unit 10B. In the same way the capacitor-based power source 9B supplies the brake control unit 10A with electric power, in particular in a failure mode or if the power supplied by the other capacitor-based power source 9A is not sufficient. For the shown embodiment the capacitor-based power source 9A bypasses the other capacitor-based power source 9B when supplying power to the brake control unit 10B associated with the last mentioned capacitor-based power source 9B.

It is possible that a control unit, in particular the brake control unit 10, also provides an energy management for defining the amount of power supplied to the different axles 61A, 61B. Here, the power management might be such that the power and the brake force are distributed according to a given ratio (e.g. front axle 60%, rear axle 40%) and/or according to a ratio dependent on the load distribution of the vehicle.

Figure 9:
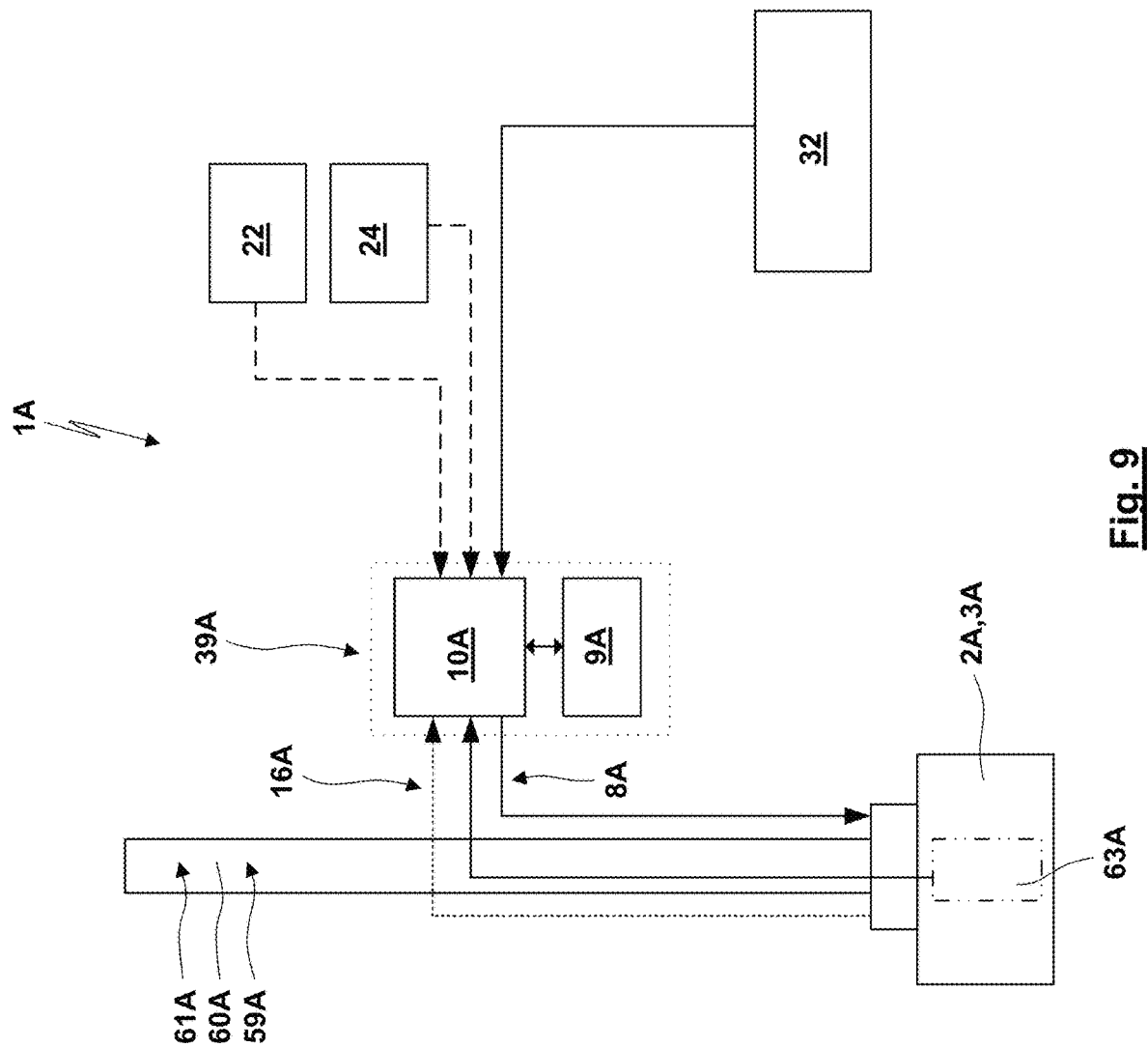

FIG. 9 shows a brake sub-system 1A similar to the brake sub-system 1A in FIG. 7. However, here a hub generator 63A is integrated into the wheel end or brake device 2. The hub generator 63A supplies power to the axle module 39A which is transmitted by the brake control unit 10A to the capacitor-based power source 9A for recharging the capacitor-based power source 9A. Here, the hub generator 63A might be always active or only activated in specific operational states (e.g. during a downhill drive of the vehicle, during a brake actuation and the like).

Figure 10:
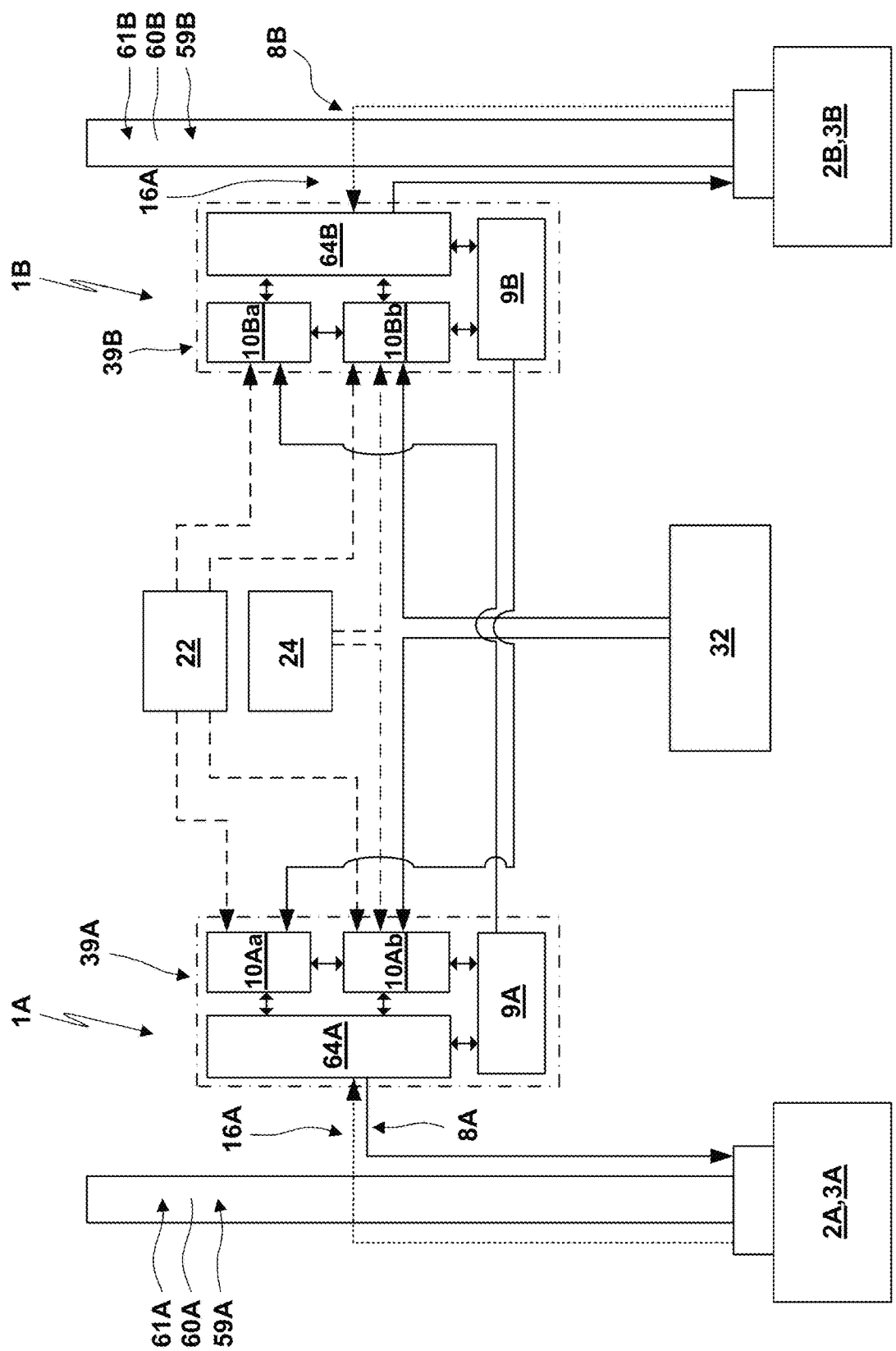

For the embodiment shown in FIG. 10 the axle modules 39A, 39B each comprise redundant brake control units 10Aa, 10Ab (10Ba, 10Bb) or CPUs. Here, one brake control unit 10Ab is supplied with power from the capacitor-based power source 9A (and also from the regeneration power source 32). The other brake control unit 10Aa can be provided with power (always or in a failure mode) alternatively or cumulatively from the brake control unit 10Ab and/or the capacitor-based power source 9B of the other axle module 39B. The same applies for the brake control units 10Ba, 10Bb of the other axle module 39B. Furthermore, for the embodiment shown in FIG. 10 power management units 64A, 64B are integrated into the axle modules 39A, 39B for controlling the power distribution between the different wheel axles 61A, 61B.

Figure 11:
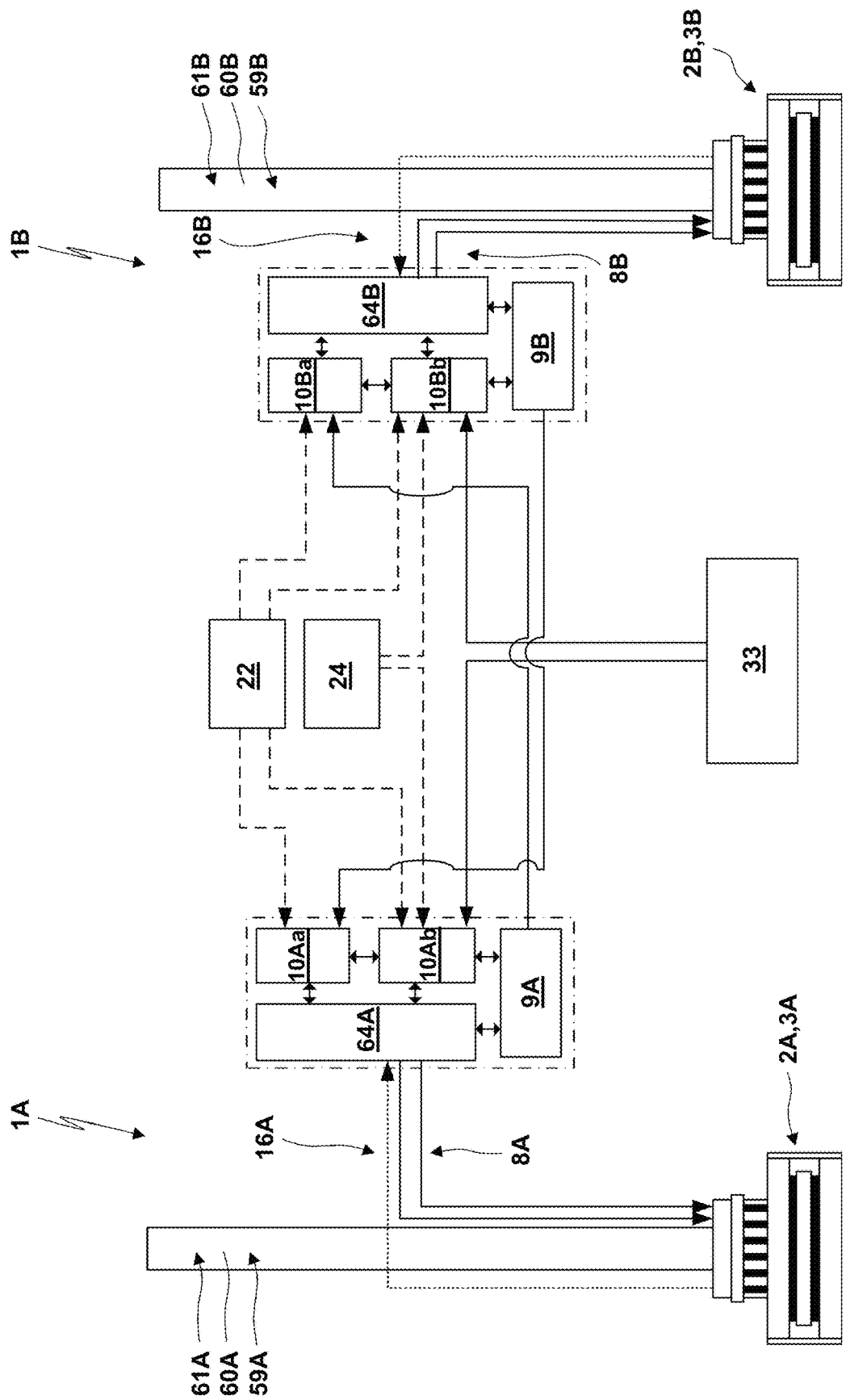

The embodiment shown in FIG. 11 generally corresponds to the embodiment of FIG. 10. Here, the brake device 2 comprises an electromechanical brake. The brake actuator 3 comprises a motor with dual windings 51-54 wherein both windings are powered alternatively or cumulatively as described above. The brake device 2 also here comprises a wheel speed sensor and/or a pad wear sensor.

Figure 12:
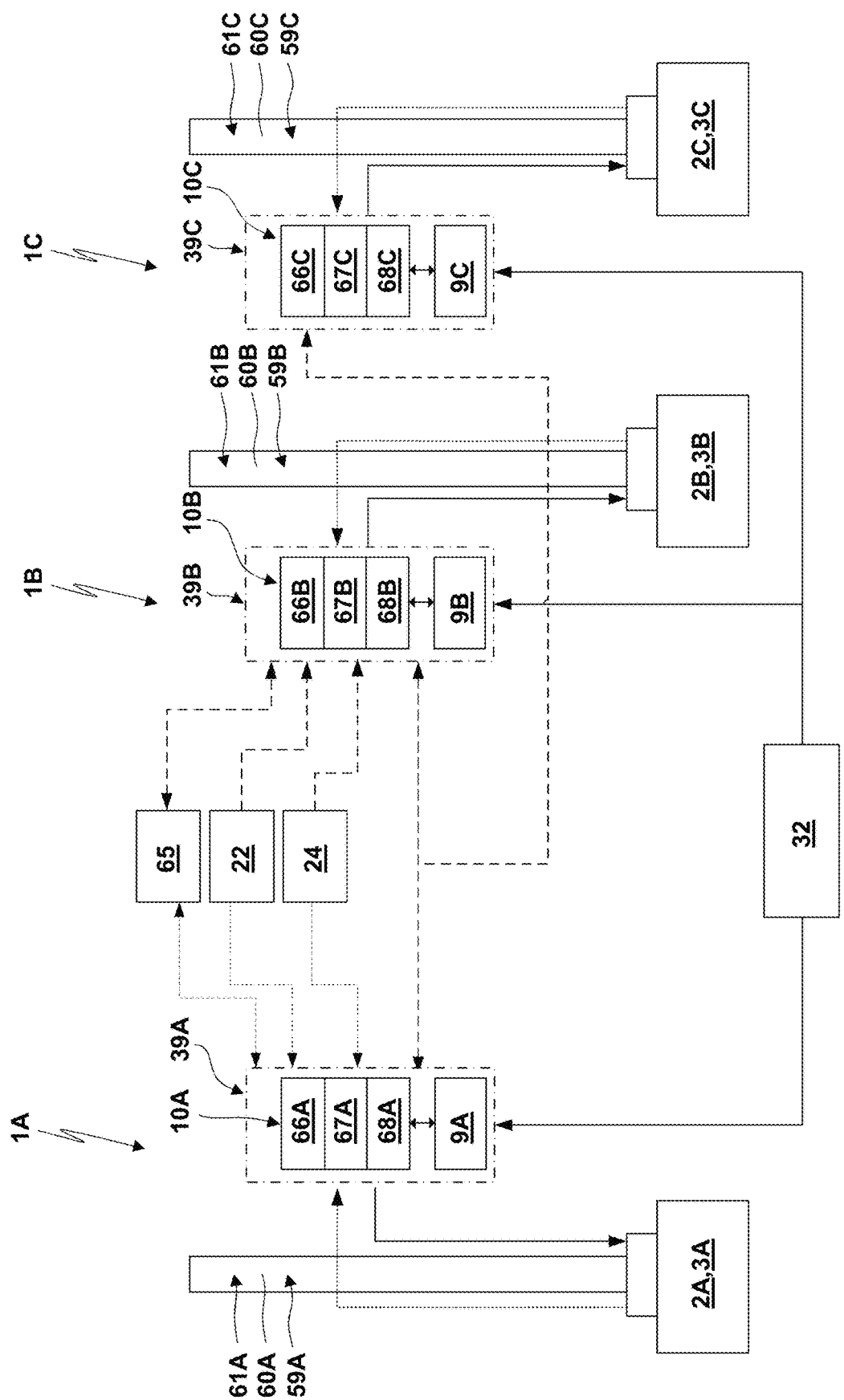

FIG. 12 shows an embodiment with electric brake sub-systems 1A, 1B, 10 related with three different wheel axles 61A, 61B, 61C. In the brake sub-systems 1A, 1B, 10 all of the axle modules 39A, 39B, 39C and the included capacitor-based power sources 9A, 9B, 9C are recharged by the recharging power source 32. The control signal of the service brake actuation units 22 and the parking brake actuation units 24 is only transferred to a part of the axle modules 39A, 39B, whereas the actuations units 22, 24 are not directly connected to the axle module 39C. In the present case, the brake control units 10A, 10B and so the axle modules 39A, 39B also communicate with a control unit 65 of another vehicle. The communication between the control unit 65 of the other vehicle and the control units of the present vehicle is a wireless communication. The communication between the vehicles can be used for the provision of a virtual axle between the two vehicles, so for transmitting a brake application signal from the other vehicle to the present vehicle and/or for coordinating the brake applications of the two vehicles. On the brake control units 10A, 10B, 100 different software loops 66, 67, 68 (being executed on one and the same CPU or on different CPUs) may be installed which run in series or in a parallelized fashion for providing the different functions (e.g. switching between the different operating modes, activating or deactivating a holding device, activating or reactivating the recuperation of energy in the brake device 2, switching between different windings of the brake actuator 3, controlling the desired brake force and the like). The software loops 66, 67, 68 may each be used for different control purposes. For one example, the software loop 66 serves for a system control. Instead, the software loop 67 serves for a brake control. Finally, the software loop 68 serves for a power control. It will be understood that it is also possible that instead of different software loops 66, 67, 68 there are different sub-CPU's responsible for the different functions.

The wheel axle modules 39A, 39B communicate with the other wheel axle unit 39C in a master-slave-interrelation so that the brake control of the brake device 2C at the wheel axle 61C is performed by the axle module 39C dependent on the output and control of the axle modules 39A, 39B.

Figure 13:
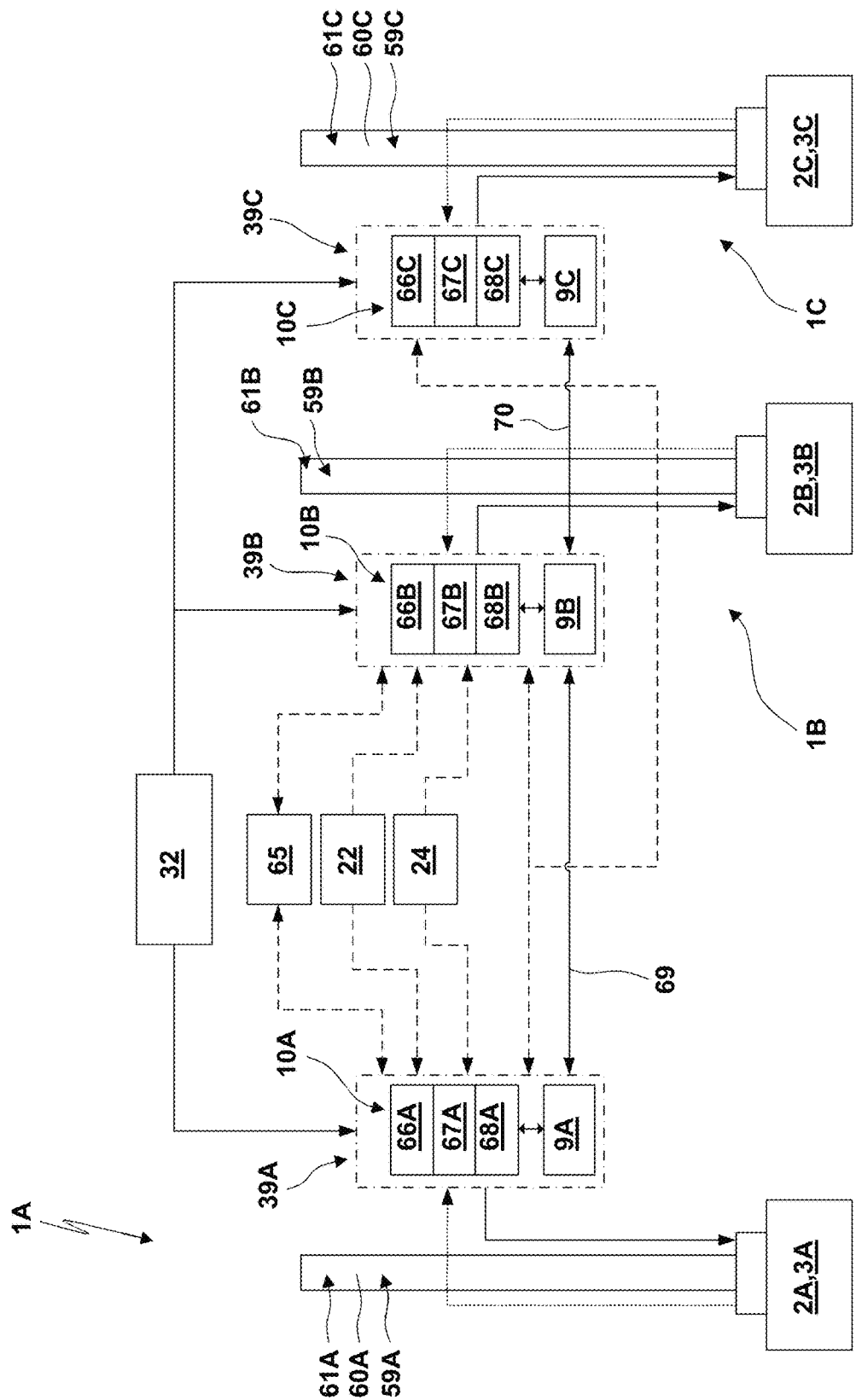

The embodiment of FIG. 13 generally corresponds to the embodiment of FIG. 12. However, here there are power links 69, 70 between the different axle modules 39A, 39B, 39C or capacitor-based power sources 9A, 9B, 9C. The flow of energy over the power links 69, 70 and between the capacitor-based power sources 9A, 9B, 9C can be controlled with different control strategies. To mention only some non-limiting examples, the capacitor-based power sources 9A, 9B, 9C might permanently be connected to each other so that there is a levelling of the energy stored in the different capacitor-based power sources 9A, 9B, 9C. It is also possible that the power links 69, 70 are only selectively activated when detecting that the energy level in one capacitor-based power source 9 falls below a threshold not being sufficient for a brake application. If the capacitor-based power sources 9A, 9B, 9C have different nominal voltages, it is also possible that a power converting unit is integrated into at least one of the power links 69, 70.

Figure 14:
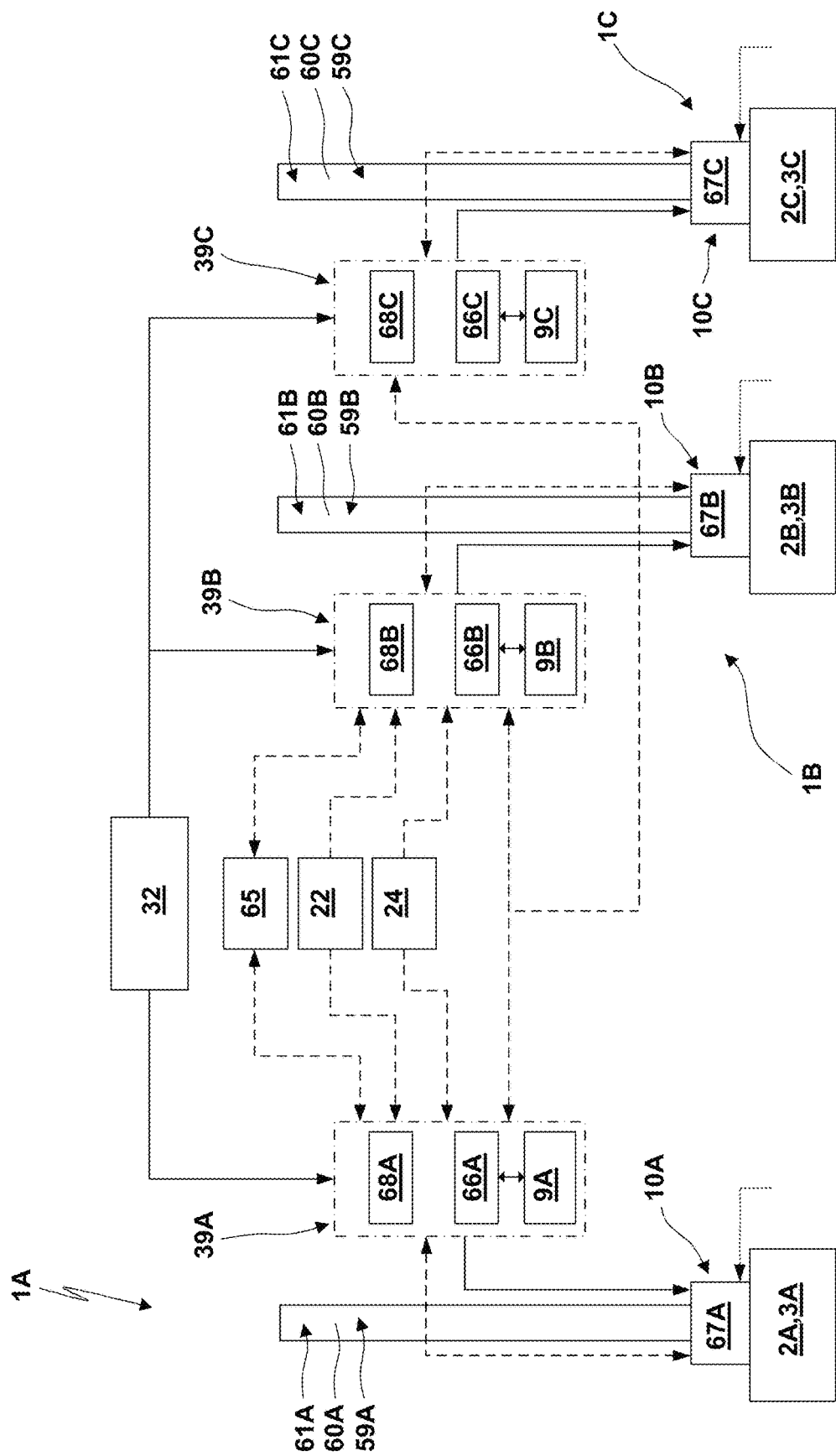

The embodiment shown in FIG. 14 generally corresponds to the embodiment of FIG. 13. However, here the software loops 67A, 67B, 67C or the related control units for the brake control are not integrated into the axle modules 39A, 39B, 39C but located at the wheel ends, in particular integrated into the brake devices 2A, 2B, 2C. Accordingly, here the control functions are split such that the brake control is performed by the brake control unit 10 integrated into the brake device 2 whereas the energy management and the system control are integrated into the axle modules 39.

Figure 15:
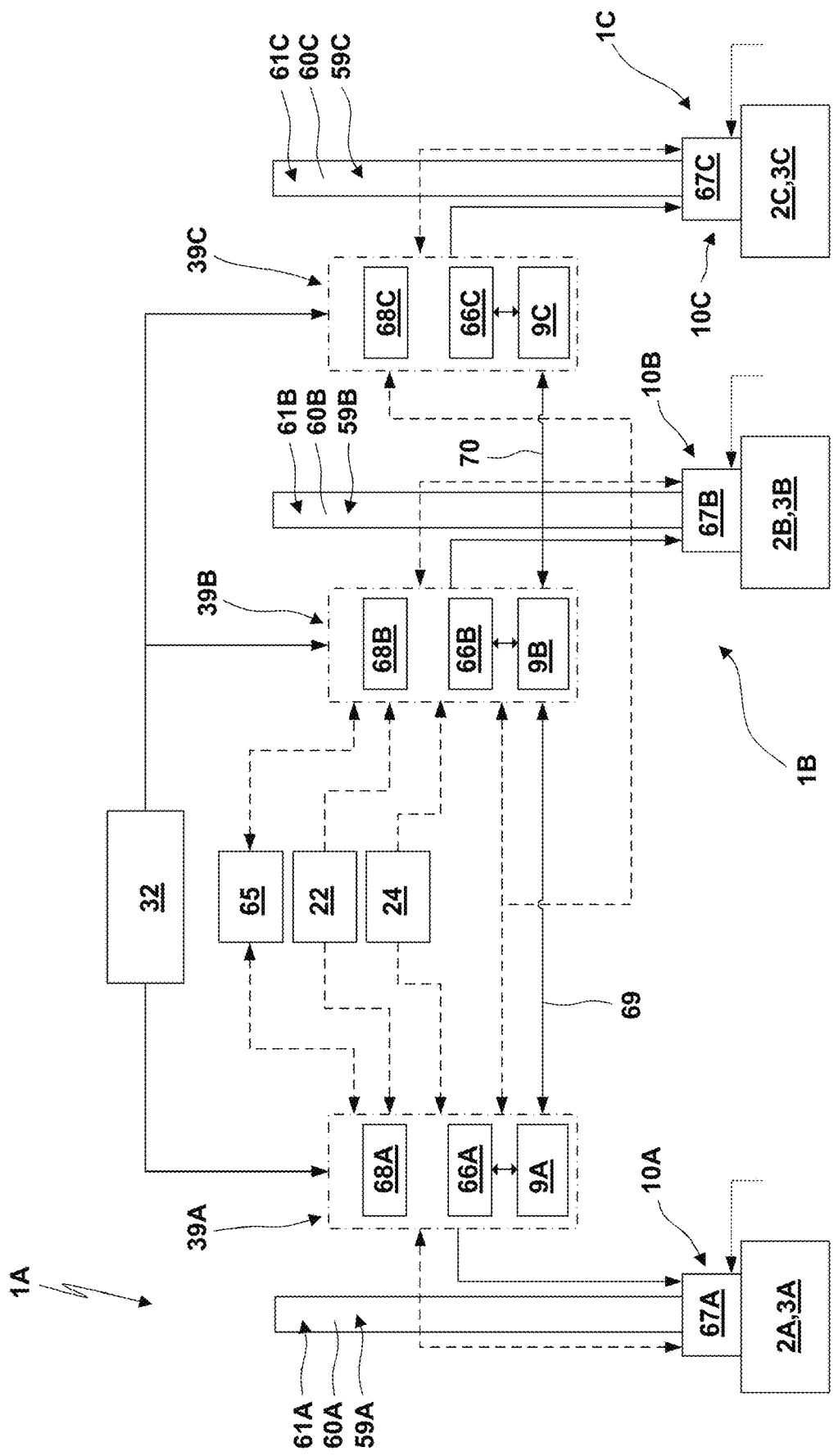

The embodiment of FIG. 15 corresponds to the embodiment of FIG. 14. However, here there are also power links 69, 70 between the axle modules 39A, 38B, 39C or capacitor-based power sources 9A, 9B, 9C for providing an energy flow with a strategy as described above.

The following might apply to all of the embodiments described above:

Within the frame of the invention it is possible to use any type of brake device, whereas in the case of using an actuation mode, a holding mode and a release mode any type of brake device comprising a holding device for keeping the brake force constant with a low energy level and/or any brake device allowing a recuperation of energy stored in the brake device can be used. To mention only one non-limiting example, a brake force transmitting unit or brake assembly as disclosed in the non-published European patent application with the application No. EP 16 170 447.3 and which comprises a holding unit for fixing the position of the brake actuator can be used. Furthermore, it is possible to use a disc brake actuator comprising a ramp transmission and a threaded transmission system and which might include a fixing unit for fixing an operational state of the disc brake actuator as disclosed in the non-published European patent application with the application No. EP 16 175 327.2 can also be used. The disclosure of these patent application is incorporated by reference into the present European patent application.

The brake control unit 10 preferably receives power from at least one of the power sources 9, 32 and sensor signals and control signals. On the basis of these signals, the brake control unit 10 determines the required energization (so the current and/or the voltage) required for energizing the brake device 2 for providing the required brake force which may also be determined by the brake control unit 10. The controlled current and/or voltage for energizing the brake device 2 is then output at an output port of the brake control unit.

Features (e.g. at least one control unit, a line connection, an electric components) and functions described for one of the embodiments can be transferred also to other embodiments for which these features or functions have not been described. It is also possible that in a modified embodiment described features and/or functions may not be present. Herewith the person with skill in the art reading the present patent application is encouraged to also perform the required adaptions for integrating the features and functions described for one embodiment into another embodiment or to cancel features or functions of described embodiments.

It is also possible to use a brake device 2 wherein without additional measures an achieved operating position of the brake actuator is held without energization, whereas a change of the operational position of the brake actuator requires an energization of the brake actuator. For one example, this can be provided by a self-locking brake actuator or brake device or brake transmission, see e.g. also the used self-locking spindle drive and/or uni-directional clutches used in the aforementioned non-published patent applications EP 16 170 447.3, EP 16 175 327.2.

It is possible that a current limiting device is arranged in the power line between the recharging power source 32 and the capacitor-based power source 9. Furthermore, it is possible that according to the invention a package of capacitors is used for the capacitor-based power source, e.g. with the following specification:

| UltraCap 48 V pack | | |
|---|---|---|
| Capacitance | 17.22 | Farad |
| Voltage | 48.6 | Volt |
| Energy | 20336 | Joule |
| Energy | 5.649021 | Wh |

Furthermore, capacitor cells of the type "Maxwell BCAP 0310" as follows can be used:

| Voltage/cell | 2.7 | Volt |
|---|---|---|
| No. of cells | 18 | Pcs. |
| Farad/cell | 309.96 | Farad |
| Energy/cell | 1129.804 | Joule |
| Energy/cell | 0.313835 | Wh |
| Weight/cell | 60 | g |
| Weight total | 1080 | g |
| Volume/cell | | l |
| Volume total | 0 | l |
| Peak current 1 s. | 250 | A |
| Cont. current (15 grader) | 25 | A |
| ESR (DC)/cell | 2.2 | mOhm |

It is possible that more than 18 pieces of these cells are used for handling cell variations and preventing overcharging of one cell. The capacitor-based power source might be dimensioned such that it is possible to provide a full brake application with a nominal brake application force of 220 kN with 500 J/brake. For the recharging of the capacitor-based power source 9 by the recharging power source 32, the charging time might be 1.67 seconds with a charging power of 500 W with a current limit of 25 A at a voltage of 24 Volt with an energy per axle of 100 J.

The system control performed in the software loop 66 is supervising the other control functions, determines control measures valid for each of the axles and/or decides about different control measures taken by control units associated with single axles.

The brake application control performed in the software loop 67 is used for controlling the energization of the brake devices 2, so for controlling the brake force.

The energy control performed in the software loop 68 serves for controlling the voltage levels and for distributing the power between different brakes, axle modules 39 and/or power sources 9, 32.

It is possible that the wiring between single units of the brake system 1 is partially or completely doubled so that a break in one wire can be handled by another wire. The system control receives information about the application of the foot pedal or a hand brake. The energy management module might comprise electronics for converting voltages, for powering the brake device, for re-directing and/or distributing power in the event that one power source breaks down and the like. The brake control handles the specifics of the brake device 2, controls the power pulses, receives information about the wheel speed, brake force, pad wear and the like.

If the brake control unit 10 forms a part of the brake device 2, it is possible that the brake control unit 10 is connected to the axle module 39 or to the capacitor-based power source 9 via an energy management control unit, whereas the brake control is performed by the brake device 2 itself (here integrated brake control units 10). In this case, a brake request is sent from the system control but the specific brake control signals are generated and sent out from the brake control unit 10.

The control unit 65 of the other vehicle may transmit and/or receive information through wireless interaction or wired interaction (in the later case the other vehicle may be a tractor for a semi-trailer). Furthermore, it is possible that information is retrieved by a control unit of the vehicle with the present brake system 1, e.g. a distance sensor to an adjacent vehicle via internal sensors as radar, ultrasonic, video and the like.

In general, the vehicle might comprise any power source which might be a power supply, an energy reservoir, an ultra-capacitor, a battery, a fuel cell, a generator, an electric motor used both for driving the vehicle as well as for recuperating energy from the moving energy of the vehicle for recharging the capacitor-based power source 9, a main line or any other electric circuitry having the same effect (this not being an exhaustive list).

The capacitor-based power source 9 should be fast enough to provide power to the brake device 2 without limiting its performance. The capacitor-based power source 9 is in particular a power source supplying power faster than the regeneration power source. This means that the capacitor-based power source 9 is able to supply high currents during short-to-medium long bursts and with great ramp-up speed. It is possible that the capacitor-based power source 9 is or comprises a capacitor.

Sensors might sense and transmit the sensor signal to one of the control units, e.g. a wheel speed sensor, a force sensor, a pad wear sensor, a thermometer and the like. The present invention can also be used in combination with an autonomous driven vehicle in which case the service and parking brake signals may be generated by the overall vehicle control system.

Figure 16:
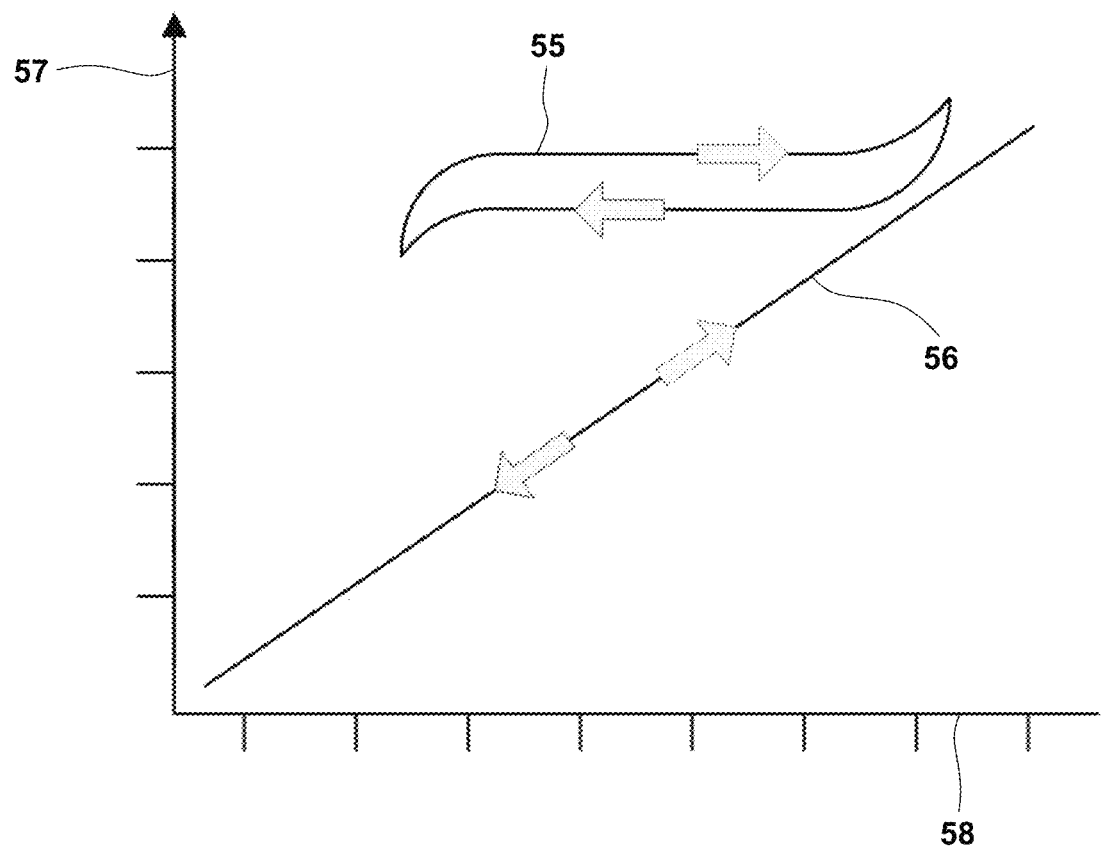
FIG. 16 shows schematic characteristics for recharging and unloading of a capacitor and a chemical power source as a battery or an accumulator.

The invention and the different disclosed embodiments suggest to use at least one capacitor-based power source 9A, 9B. FIG. 16 shows a schematic diagram showing the recharging and unloading characteristic 55 of an accumulator (wherein the energy is stored on the basis of a chemical process) and the corresponding recharging and unloading characteristic 56 of a capacitor-based power source 9. These characteristics 55, 56 are shown in FIG. 16 with the voltage 57 supplied by the accumulator/capacitor-based power source over the energy stored 58.

The characteristics 55, 56 schematically show the following differences:

a) The capacitor-based power source 9 has at least a smaller hysteresis than the accumulator leading to an increased power efficiency.

b) A measurement of the voltage of a capacitor-based power source allows a determination of the energy stored by the capacitor-based power source under use of the characteristic 56. Accordingly, it is very simple to monitor the charging level of the capacitor-based power source. Instead, for an accumulator it is not possible to determine the charging level of the accumulator in a simple fashion on the basis of a measurement of the voltage supplied.

The characteristics 55, 56 are only schematic and have been chosen to illustrate the basic differences. However, differing from the shown characteristics 55, 56 it is e.g. possible that the characteristic 56 of the capacitor-based power source 9 used by the invention comprises a different form, e.g. a curved characteristic. However, the characteristic 56 of the capacitor-based power source 9 may allow a direct determination of the energy level stored on the basis of the voltage.

Within the frame of the invention the energy level of the capacitor-based power source 9 is monitored and/or controlled by a control unit which might be a control unit 10 and/or a control unit controlling the recharging energy flow from a recharging power source 32.

During a brake action three different phases can be distinguished:

a) In a "brake actuation mode" the brake force is increased.

b) In a "holding mode" a previously achieved brake force is held constant.

c) In a "release mode" the brake force is reduced.

In the application mode the brake device is controlled such that by an increase of the energization of the brake actuator the brake force is increased. It is possible that during the holding mode the energization of the brake device is kept constant.

However, it is also possible that in the holding mode the brake device 2 is energized on a reduced energization level. In this case, the brake device 2 may include a holding device which fixes the operating position of the brake actuator 3 on a reduced power level. The holding device preferably fixes a displacement of a brake actuator element as a pushrod, a plunger and the like. The holding device might include an electromagnet which actuates a locking element for the brake actuator in the not energized state. Accordingly, without energization a previously achieved brake force will be held by the holding device. Instead, in the application mode and in the release mode the electromagnet can be energized for unlocking the brake actuator and for controlling the brake force dependent on the energization of the brake device.

It is possible that in the release mode the brake device acts as a generator supplying high power to increase the energy level of the capacitor-based power source(s) 9.

The actuator is to be regarded as a mechanical energy storage when applied.

The mechanical energy stored in the brake actuator is $$E_{actmech}(s) = \int F_{act}(S) * ds$$

The energy level in the actuator is monitored and used in the energy control module. The energy level is strongly dependent upon the elasticity characteristic which is dependent upon several conditions, the pad wear, the temperature and others.

The electric energy with an electromechanical efficiency of $Eff_{em}$ to apply the brake is $$E_{apply}(s) = \frac{1}{Eff_{em}} * E_{actmech}(s)$$

The available energy from each actuator to charge the ultracapacitor module is $$E_{release}(s) = Eff_{em} * E_{actmech}(s)$$

The energy level in the actuator is monitored and used in the energy control module. The energy level is strongly dependent upon the elasticity characteristic which is dependent upon several conditions pad wear, temperature and more The maximum recoverable energy is $$E_{release}(s) = (1 - Eff_{em}^2) * E_{apply}(s)$$

The energy level in the capacitor-based power source is monitored and used in the power control strategy.

The maximum energy level will be limited by the maximum allowed energy of the capacitor-based power source minus the electromechanical energy stored in the applied brake device.

The maximum energy stored in the capacitor-based power source 9 is limited by the limit for the voltage over the capacitor-based power source 9

$$E_{ucmax} = \frac{V_{uclim} * C_{uc}}{2}$$

The capacitance is defining the energy storage capacity of the capacitor-based power sources and is constantly monitored by measuring the current of the capacitor-based power source and the voltage supplied by the capacitor-based power source and defining the capacitance of the capacitor-based power source through the following equation:

$$C_{uc}(t) = \frac{\int_0^t i * dt}{V_{uc1} - V_{uc0}}$$

As the applied brake device is a mechanical energy storage, the capacitor-based power source shall be able to receive the energy from the brake actuator. With applied brake device the maximum energy/voltage in the capacitor-based power source is limited to:

$$E_{axlemax}(t) = E_{ucmax} - E_{actuators}(t)$$

$$V_{ucmax}(t) = V_{uclim} - \frac{2 * E_{actuators}(t)}{C_{uc}(t)}$$

An energy control logic installed in one of the control units is monitoring and controlling the energy level stored in the capacitor-based power sources and the energy loading characteristics of the recharging power source(s). Both the capacitor-based power sources and the brake devices serve as energy reservoirs. The energy level control considers both the energy status and the power demand from the brake system. In order to save energy, a park-lock function or a holding device for keeping a generated brake force constant can be used below a vehicle speed threshold to bring the vehicle to a stop.

Preferably, the control strategy includes different modes, namely a) a normal brake control mode, b) a dynamic brake control mode and c) a residual brake control mode.

During the normal brake control mode the energy level is controlled according to the normal rules. The reloading current from the recharging power source(s) is increased with lower energy levels in the capacitor-based power sources and dependent upon the energy levels in the brake actuators:

$$I_{charge} = f(E_{actuators}, V_{uc})$$

In the dynamic brake control mode the brake system is required to act faster so that in the dynamic brake control mode there is more energy consumed than during the normal brake control mode. This could be the case with a limited available torque due to a low-friction road $$I_{charge} = I_{chargemax}$$

In a residual brake control mode there are no or very limited energy resources in the capacitor-based power sources available. In order to guarantee the requirements for a remaining number of brake applications, the holding device, in particular an electromagnet, is used to hold any previously reached brake force as long as required for the desired brake actuation in order to save brake system energy.

As explained above, it is possible to easily monitor the charging level of the capacitor-based power sources on the basis of the characteristic as shown in FIG. 16. In the following, a different (alternative or cumulative) embodiment for monitoring the energy level of the capacitor-based power sources will be described:

The capacitor-based power source has an energy storage capacity that corresponds to the capacitor value The capacitor-based power source might have an energy storage capacity that corresponds to the capacitor value $C_{uc}$ of the capacitor-based power source. By measuring the current in and out of the capacitor-based power source the status of the energy level is easily monitored. Preferably, the energy input, the energy output, the stored energy level and the energy storage capacity are measured and monitored. This is easily provided by measuring the voltage of the capacitor-based power source $V_{uc}$ and the current $i_{uc}$ to the capacitor-based power source. The transferred energy in and out of the capacitor-based power source is $i_{uc} \cdot V_{uc}$. The capacitance of the capacitor-based power source is $$C_{uc} = \frac{\int_{t0}^{t1} i_{uc} dt}{V_{uc1} - V_{uc0}}$$

where $V_{uc0}$ is the voltage of the capacitor-based power source at time $t_0$,
$V_{uc1}$ is the voltage of the capacitor-based power source at time $t_1$ and
$\int_{t0}^{t1} i_{uc} dt$ is the integration of the current from $t_0$ to $t_1$.
The resulting energy storage level is equal to $$E_{uc} = \frac{C_{uc} \cdot V_{uc}^2}{2}.$$

The losses of the capacitor-based power source are lower than for other chemical or electrochemical accumulators. Accordingly, the use of the capacitor-based power sources is efficient to discharge when delivering high power for a brake actuation and rechargeable when receiving the mechanical "spring" energy from the brake device when releasing the brake. Compared to pneumatical brake systems where no recharging is made, the electromechanical brake system will decrease the power consumption significantly. The use of an energy reservoir provided by the capacitor-based power sources makes the brake system possible to connect to different types of low-power recharging power sources like batteries, battery/generator modules or generators only or any other available power source.

In the figures the dotted lines show sensor lines, wherein the solid lines represent power lines and the dashed lines represent control lines.

For all of the disclosed embodiments and/or the embodiments defined by at least one of the claims one, a plurality or all of the following technical measures might apply:
a) It is possible that the recharging power source 32 can in some operational states be directly connected to the electric brake device 2.
b) The electric brake system 1 might comprise a monitoring device monitoring the charging level of the capacitor-based power source 9.
c) A voltage converting device 25, 26, 27, 35, 36 may be interposed
   between the recharging power source 32 and the capacitor-based power source 9,
   between the capacitor-based power source 9 and the at least one electric brake device 2 and/or
   between a connection between the recharging power source (9) and the at least one electric brake device 2.
d) It is possible that in the electric brake system 1 electric lines between the recharging power source 32 and the capacitor-based power source 9 have a lower performance than electric lines between the capacitor-based power source 9 and the electric brake device 2.
e) It is possible that in the electric brake system 1 the electric brake device 2 can be operated in a low power mode wherein a brake application is held constant.
f) It is possible that in the electric brake system 1 the capacitor is a package of a plurality of single sub-capacitors.
g) It is possible that in the electric brake system 1 control logic is provided for switching between a normal mode, a dynamic mode and/or a residual mode.
h) It is possible that in the electric brake system 1 the recharging power source 32 is a battery, a fuel cell or an external main electric power supply line.
i) It is possible that in the electric brake system 1 electric power is supplied to the capacitor-based power source 9 and/or recharging power source 32 by at least one generator.
j) It is possible that in the electric brake system 1 the module 39 contains two redundant control devices 10Aa, 10Ab; 10Ba, 10Bb.
k) It is possible that in the electric brake system 1 electric brake devices 2A, 2B of a wheel axle unit 59A, 59B are controlled by a control device 10A, 10B which cooperates in a master-slave-interaction with a control device 100 controlling the brake application of brake actuators 2C of another wheel axle unit 59C.
l) It is possible that in the electric brake system 1 the capacitor-based power sources 9A, 9B have different nominal voltages.
m) It is possible that in the electric brake system 1 the electric brake device 2 comprises a mechanical self-enforcing mechanism.
n) It is possible that in the electric brake system 1 the electric brake device 2 comprises a plunger which is mechanically connected to the brake element 4 for biasing the brake element 4 and the electric brake actuator 3 biases the plunger via a rotating brake lever.
o) It is possible that in the electric brake system 1 a or the control device 10A, 10B comprises control logic for controlling at least one control circuit 16A, 16B for activating a burst mode wherein in the burst mode at the same time
   the first capacitor-based power source 9B supplies first windings 51; 53 of the electric brake actuator 3 with electric power and the second capacitor-based power source 9A supplies second windings 52; 54 of the electric brake actuator 3 with electric power.

p) It is possible that in the electric brake system 1 the recharging power source is a power source also used for supplying power to an electric drive aggregate for moving the vehicle.

Many variations and modifications may be made to the preferred embodiments of the invention without departing substantially from the spirit and principles of the invention. All such modifications and variations are intended to be included herein within the scope of the present invention, as defined by the following claims.

We claim:

1. An electric service brake system (1) for a vehicle comprising
   a) at least one electric service brake device (2) wherein a service brake force is generated by an electric service brake actuator (3) and
   b) a capacitor-based power source (9) which
      ba) is formed by or comprises a capacitor and
      bb) supplies electric power to the service electric brake actuator (3),
   c) a recharging power source (32), the recharging power source, the capacitor-based power source and the electric service brake device being connected in series in the aforementioned order during normal operation,
   d) at least one control device comprising control logic for controlling a flow of electric energy from the recharging power source (32) to the capacitor-based power source (9),
   e) a brake actuation mode wherein the electric service brake device (2) is controlled such that a desired brake force is generated, an increasing brake force is generated and/or a previously generated brake force is upheld,
   f) wherein the brake actuation mode comprises
      fa) a holding sub-mode wherein a locking, fixing or holding device is actuated which keeps a previously generated service brake force of the electric service brake device (2) constant and wherein the service brake device (2) is energized on a reduced energization level and
      fb) a brake force control sub-mode wherein the service brake force is controlled on the basis of an actual service brake force demand.

2. The electric brake system (1) of claim 1, wherein control logic is provided which initiates a supply of electric power from the recharging power source (32) to the electric brake device (2) in the case of detecting
   a) a failure of the capacitor-based power source (9),
   b) a critical extent of brake actuations per time interval,
   c) a low charging level of the capacitor-based power source (9) and/or
   d) a critical changing rate of a charging level of the capacitor-based power source (9).

3. The electric brake system (1) of claim 1, wherein control logic is provided for controlling the flow of energy from the recharging power source (32) to the capacitor-based power source (9) dependent on a monitored charging level of the capacitor-based power source (9).

4. The electric brake system (1) of claim 1, wherein control logic is provided for controlling a return flow of electric energy recovered by the electric brake device (2) during a brake release to the capacitor-based power source (9) for recharging the capacitor-based power source (9).

5. The electric brake system (1) of claim 4, wherein control logic is provided which switches the electric brake device (2) between
   a) the brake actuation mode wherein the electric brake device (2) is controlled such that a desired brake force is generated, an increasing brake force is generated and/or a previously generated brake force is upheld,
   b) a recovery mode wherein during a release of the electric brake device (2) energy is recovered by the electric brake device (2) and recovered energy is transferred to the capacitor-based power source (9) for recharging the capacitor-based power source (9).

6. The electric brake system (1) of claim 5, wherein control logic for controlling the flow of electric energy between the capacitor-based power source (9) and the recharging power source (32) considers a recoverable energy level stored in the applied electric brake device (2).

7. The electric brake system (1) of claim 1, wherein a capacity of the capacitor of the capacitor-based power source (9) is dimensioned such that after eight full-stroke applications of the electric brake device (1) a charging level of the capacitor is not less than a charging level required to obtain a predefined security braking performance on a ninth brake application.

8. The electric brake system (1) of claim 1, wherein
   a) the capacitor-based power source (9) supplies power to two electric brake devices (2) located at different vehicle sides of a vehicle axle (61) or
   b) two capacitor-based power sources (9) supply power to four electric brake devices (2) of a double axle.

9. The electric brake system (1) of claim 1, wherein
   a) a first and a second capacitor-based power source (9A, 9B) are provided, each of them being associated to at least one electric brake device (2A, 2B) of a respective vehicle axle (61A, 61B),
   b) in a normal operational mode the two capacitor-based power sources (9A; 9B) are each connected with at least one electric brake device (2A; 2B) of a respective vehicle axle (61A; 61B) but separated from the electric brake device(s) (2B; 2A) of the other vehicle axle (61B; 61A) and
   c) in a failure mode one of the two capacitor-based power sources (9A) is connected to electric brake devices (2A, 2B) of both vehicle axles (61A, 61B).

10. The electric brake system (1) of claim 9, wherein the capacitor-based power source (9) is connected via a power control device and/or a brake control device to at least one brake actuator (3) or electric brake device (2).

11. The electric brake system (1) of claim 1, wherein the capacitor-based power source (9) is connected via a power control device and/or a brake control device to at least one brake actuator (3) or electric brake device (2).

12. The electric brake system (1) of claim 1, wherein
    a) the capacitor-based power source (9) and
    b) a voltage converting device (25, 26, 27, 35, 36), a power control device, a
    system control device and/or a control device
    are combined into a module (39) for controlling at least one electric brake device (2) associated therewith.

13. The electric brake system (1) of claim 12, wherein the module (39) is
    a) mounted to a wheel axle unit (59) which comprises the associated electric brake device (2),
    b) integrated into a wheel axle unit (59) which comprises the associated electric brake device (2) or c) mounted to a chassis in a region close to the wheel axle unit (59) which comprises the associated electric brake device (2).

14. The electric brake system (1) of claim 1, comprising
a) a first and a second capacitor-based power source (9A, 9B) and
b) a first control circuit (16A) and a second control circuit (16B),
c) wherein the first and the second capacitor-based power source (9A, 9B) and/or the first control circuit (16A) and the second control circuit (16B) are each connectable to at least one electric brake actuator (3) for providing a redundant electric power supply and/or a redundant control and
d) wherein at least one voltage converting device (25; 35, 36) connects
  da) at least one of the capacitor-based power source (9A, 9B) to the recharging power source and/or
  db) the first capacitor-based power source (9A) and the second capacitor-based power source (9B).

15. The electric brake system (1) of claim 1, wherein that
a) when using a first capacitor-based power source (9B) in a normal mode the first capacitor-based power source (9B) supplies first windings (51; 53) of the associated electric brake actuator (3) with electric power and
b) when activating a second capacitor-based power source (9A) in the case of
  ba) a detected failure of the capacitor of the first capacitor-based power source (9B),
  bb) a detected critical extend of brake actuations per time interval and/or
  bc) a detected low energy level of the capacitor-based power source,
the second electric power source (9A) supplies second windings (52; 54) of the electric brake actuator (3) with electric power.

16. The electric brake system (1) of claim 1, wherein that control logic is provided for deactivating at least one consumer which is also supplied with power by at least one capacitor-based power source (9A, 9B) and which does not have an impact on a brake function wherein the at least one consumer is deactivated dependent on
a) an energy level of at least one of the capacitor-based power sources (9A, 9B),
b) a detected failure of the capacitor of the capacitor-based power source and/or
c) a detected critical extend of brake actuations per time interval.

17. The electric brake system (1) of claim 1, wherein that
a) a first capacitor-based power source (9B) is used in normal operating states,
b) the first capacitor-based power source (9B) is connected to two separate electric brake actuators or groups (7A, 7B) of brake actuators (3*a*, 3*b*; 3*c*, 3*d*) by two parallel power supply lines (12A, 12B) wherein a control unit (10A, 10B) and an optional voltage converter (26, 27) is/are integrated into each of the two parallel power supply lines (12A, 12B),
c) a second capacitor-based power source (9A) is used in the case of an abnormality such that the second capacitor-based power source (9A) is connected to the control units (10A, 10B) and the two separate electric brake actuators or groups (7A, 7B) of brake actuators (3*a*, 3*b*; 3*c*, 3*d*).

18. The electric brake system (1) of claim 1, wherein that a module (39) is provided which comprises
a) a capacitor-based power source (9A),
b) a control unit (10A),
c) optionally a voltage converting device (35),
d) at least one output port (42, 43, 44, 46, 47) for
  da) a control signal for a first brake actuator or a first group (7A) of brake actuators (3*a*, 3*b*),
  db) a power supply for a first brake actuator or a first group (7A) of brake actuators (3*a*, 3*b*),
  dc) a control signal for a second brake actuator or a second group (7B) of brake actuators (3*c*, 3*d*) and/or
  dd) a power supply for a second brake actuator or a second group (7B) of brake actuators (3*c*, 3*d*) and/or
e) at least one input port (40, 41, 45) for
  ea) a brake signal from a service brake actuation unit (22) and/or a parking brake actuation unit (24),
  eb) a power supply from an electric power source (32) of the vehicle,
  ec) a control signal for a first brake actuator or a first group (7A) of brake actuators (3*a*, 3*b*),
  ed) a power supply for the first brake actuator or the first group (7A) of brake actuators (3*a*, 3*b*),
  ee) a control signal for a second brake actuator or a second group (7B) of brake actuators (3*c*, 3*d*) and/or
  ef) a power supply for the second brake actuator or the second group (7B) of brake actuators (3*c*, 3*d*).

19. An electric brake system (1) for a vehicle comprising
a) at least one electric brake device (2) wherein a brake force is generated by an electric brake actuator (3) and
b) a capacitor-based power source (9) which
  ba) is formed by or comprises a capacitor and
  bb) supplies electric power to the electric brake actuator (3),
c) a recharging power source (32),
d) at least one control device comprising control logic for controlling a flow of electric energy from the recharging power source (32) to the capacitor-based power source (9),
e) a brake actuation mode wherein the electric brake device (2) is controlled such that a desired brake force is generated, an increasing brake force is generated and/or a previously generated brake force is upheld,
f) wherein the brake actuation mode comprises
  fa) a holding sub-mode wherein a previously generated brake force of the electric brake device (2) is kept constant and
  fb) a brake force control sub-mode wherein the brake force is controlled on the basis of an actual brake force demand,
wherein:
a) a first and a second capacitor-based power source (9A, 9B) are provided, each of them being associated to at least one electric brake device (2A, 2B) of a respective vehicle axle (61A, 61B),
b) in a normal operational mode the two capacitor-based power sources (9A; 9B) are each connected with at least one electric brake device (2A; 2B) of a respective vehicle axle (61A; 61B) but separated from the electric brake device(s) (2B; 2A) of the other vehicle axle (61B; 61A) and
c) in a failure mode one of the two capacitor-based power sources (9A) is connected to electric brake devices (2A, 2B) of both vehicle axles (61A, 61B).

20. An electric brake system (1) for a vehicle comprising
a) at least one electric brake device (2) wherein a brake force is generated by an electric brake actuator (3) and
b) a capacitor-based power source (9) which
  ba) is formed by or comprises a capacitor and bb) supplies electric power to the electric brake actuator (3),
c) a recharging power source (32),
d) at least one control device comprising control logic for controlling a flow of electric energy from the recharging power source (32) to the capacitor-based power source (9),
e) a brake actuation mode wherein the electric brake device (2) is controlled such that a desired brake force is generated, an increasing brake force is generated and/or a previously generated brake force is upheld,
f) wherein the brake actuation mode comprises
   fa) a holding sub-mode wherein a previously generated brake force of the electric brake device (2) is kept constant and
   fb) a brake force control sub-mode wherein the brake force is controlled on the basis of an actual brake force demand,
wherein that:
a) when using a first capacitor-based power source (9B) in a normal mode the first capacitor-based power source (9B) supplies first windings (51; 53) of the associated electric brake actuator (3) with electric power and
b) when activating a second capacitor-based power source (9A) in the case of
   ba) a detected failure of the capacitor of the first capacitor-based power source (9B),
   bb) a detected critical extension of brake actuations per time interval and/or
   bc) a detected low energy level of the first capacitor-based power source (9B),
the second capacitor-based power source (9A) supplies second windings (52; 54) of the associated electric brake actuator (3) with electric power.

21. An electric brake system (1) for a vehicle comprising
a) at least one electric brake device (2) wherein a brake force is generated by an electric brake actuator (3) and
b) a capacitor-based power source (9) which
   ba) is formed by or comprises a capacitor and
   bb) supplies electric power to the electric brake actuator (3),
c) a recharging power source (32),
d) at least one control device comprising control logic for controlling a flow of electric energy from the recharging power source (32) to the capacitor-based power source (9),
e) a brake actuation mode wherein the electric brake device (2) is controlled such that a desired brake force is generated, an increasing brake force is generated and/or a previously generated brake force is upheld,
f) wherein the brake actuation mode comprises
   fa) a holding sub-mode wherein a previously generated brake force of the electric brake device (2) is kept constant and
   fb) a brake force control sub-mode wherein the brake force is controlled on the basis of an actual brake force demand,
wherein that control logic is provided for deactivating at least one consumer which is also supplied with power by at least one capacitor-based power source (9A, 9B) and which does not have an impact on a brake function wherein the at least one consumer is deactivated dependent on
a) an energy level of the at least one capacitor-based power source (9A, 9B),
b) a detected failure of the capacitor of the at least one capacitor-based power source (9A, 9B), and/or
c) a detected critical extension of brake actuations per time interval.

22. An electric service brake system (1) for a vehicle comprising
a) at least one electric service brake device (2) wherein a service brake force is generated by an electric service brake actuator (3) and
b) at least two control units (10A, 10B), each having a capacitor-based power source (9) which is formed by or comprises a capacitor and supplies electric power to the electric service brake actuator (3),
c) a control device comprising control logic,
d) a connection to a recharging power source (32), the control device controlling a flow of electric energy from the recharging power source (32) to the capacitor-based power sources (9),
e) each control unit (10A, 10B) being configured to supply power to a power supply circuit (8A, 8B),
f) the control units (10, 10B) being configured to supply electric power also to another power supply circuit (8B, 8A),
wherein the electric service brake system further comprises a brake actuation mode wherein the electric service brake device (2) is controlled such that a desired brake force is generated, an increasing brake force is generated and/or a previously generated brake force is upheld, wherein the brake actuation mode comprises
   fa) a holding sub-mode wherein a locking, fixing or holding device is actuated which keeps a previously generated service brake force of the electric service brake device (2) constant and wherein the service brake device (2) is energized on a reduced energization level and
   fb) a brake force control sub-mode wherein the service brake force is controlled on the basis of an actual service brake force demand.

* * * * *